(12) United States Patent
Itakura

(10) Patent No.: US 11,210,842 B2
(45) Date of Patent: Dec. 28, 2021

(54) IMAGE PROCESSING APPARATUS, IMAGE PROCESSING METHOD AND STORAGE MEDIUM

(71) Applicant: CANON KABUSHIKI KAISHA, Tokyo (JP)

(72) Inventor: Kina Itakura, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 50 days.

(21) Appl. No.: 16/658,285

(22) Filed: Oct. 21, 2019

(65) Prior Publication Data
US 2020/0126290 A1    Apr. 23, 2020

(30) Foreign Application Priority Data
Oct. 23, 2018    (JP) .............................. JP2018-199167

(51) Int. Cl.
*G06T 15/00* (2011.01)
*G06T 15/20* (2011.01)

(52) U.S. Cl.
CPC .......... *G06T 15/20* (2013.01); *G06T 2215/16* (2013.01)

(58) Field of Classification Search
None
See application file for complete search history.

(56) References Cited

U.S. PATENT DOCUMENTS

| 6,217,446 B1* | 4/2001 | Sanbongi ................ A63F 13/10 |
| | | 463/7 |
| 6,263,100 B1* | 7/2001 | Oshino ................... G06K 9/209 |
| | | 382/154 |
| 7,646,394 B1* | 1/2010 | Neely, III ........... G06F 3/04842 |
| | | 345/633 |
| 8,245,114 B2* | 8/2012 | Nakagawa ............ H04L 1/0041 |
| | | 714/776 |
| 10,607,409 B2* | 3/2020 | Troy ....................... G06T 15/20 |
| 2002/0140694 A1* | 10/2002 | Sauer .................... G06T 19/006 |
| | | 345/419 |
| 2006/0072175 A1* | 4/2006 | Oshino .................. G06T 15/10 |
| | | 358/537 |

(Continued)

FOREIGN PATENT DOCUMENTS

JP    2014010804 A    1/2014

*Primary Examiner* — Martin Mushambo
(74) *Attorney, Agent, or Firm* — Carter, DeLuca & Farrell LLP

(57) ABSTRACT

The image processing apparatus that generates a virtual viewpoint image based on images obtained by capturing an image capturing area from directions different from one another by a plurality of image capturing apparatuses includes: a specification unit configured to specify a relationship between a sight direction from a virtual viewpoint corresponding to the virtual viewpoint image and an image capturing direction of an image capturing apparatus; a selection unit configured to select one or more image capturing apparatuses based on the specified relationship and a resolution relating to image capturing by the image capturing apparatus; and a pixel value determination unit configured to determine a pixel value of the virtual viewpoint image by using a pixel value or pixel values of one or more images obtained based on image capturing by the selected one or more image capturing apparatuses.

22 Claims, 12 Drawing Sheets

(56) References Cited

U.S. PATENT DOCUMENTS

| | | | | |
|---|---|---|---|---|
| 2007/0122027 A1* | 5/2007 | Kunita | ............... | G06T 7/593 |
| | | | | 382/154 |
| 2011/0261050 A1* | 10/2011 | Smolic | ............... | H04N 19/597 |
| | | | | 345/419 |
| 2012/0092325 A1* | 4/2012 | Katano | ............... | A63F 13/10 |
| | | | | 345/419 |
| 2012/0194514 A1* | 8/2012 | Sakaguchi | ......... | H04N 13/383 |
| | | | | 345/419 |
| 2013/0069864 A1* | 3/2013 | Hirooka | ............. | H04N 13/117 |
| | | | | 345/156 |
| 2014/0009493 A1* | 1/2014 | Tanaka | ............... | H04N 13/261 |
| | | | | 345/629 |
| 2015/0178595 A1* | 6/2015 | Sawada | ............... | G06T 7/571 |
| | | | | 382/195 |
| 2016/0127692 A1* | 5/2016 | Yoneji | ............... | G06K 9/00664 |
| | | | | 348/159 |
| 2016/0287994 A1* | 10/2016 | Tamaoki | ............. | A63F 13/42 |
| 2018/0061070 A1* | 3/2018 | Higuchi | ............. | G06T 15/205 |
| 2018/0061086 A1* | 3/2018 | Yoshimura | ......... | H04N 5/23229 |
| 2018/0089523 A1* | 3/2018 | Itakura | ............... | G06T 7/174 |
| 2018/0096520 A1* | 4/2018 | Yoshimura | ............ | G06T 15/50 |
| 2018/0144446 A1* | 5/2018 | Morifuji | ............. | G09G 5/026 |
| 2018/0332218 A1* | 11/2018 | Yoshimura | ......... | H04N 5/23232 |
| 2019/0238819 A1* | 8/2019 | Furukawa | ............ | H04N 13/00 |
| 2019/0311526 A1* | 10/2019 | Sugio | ............... | H04N 13/117 |
| 2019/0364265 A1* | 11/2019 | Matsunobu | ...... | H04N 21/21805 |

\* cited by examiner

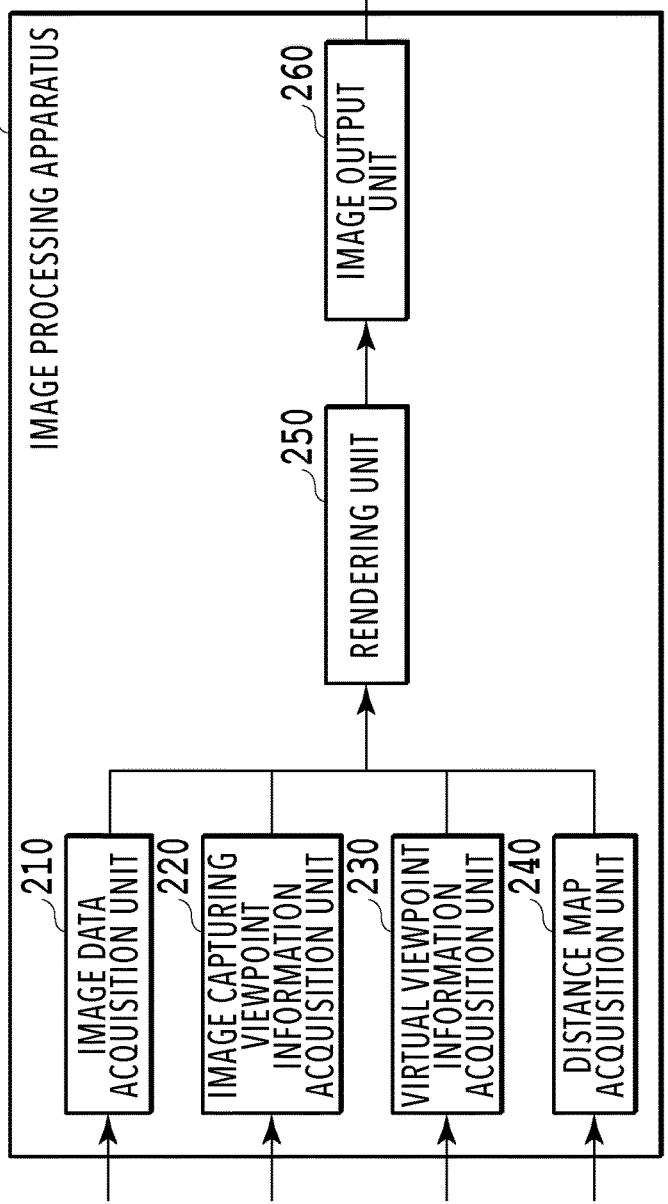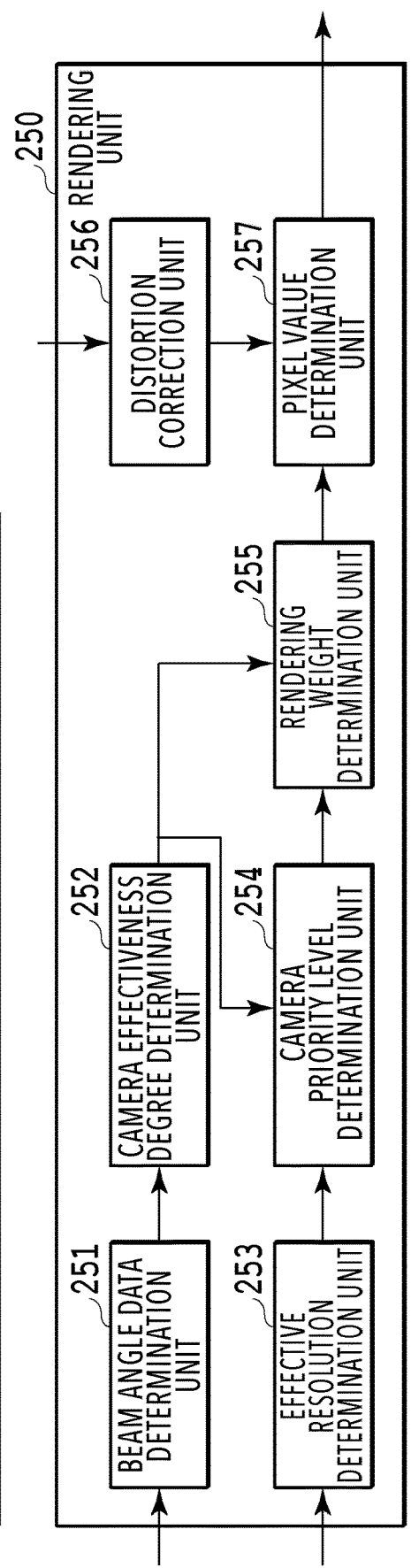

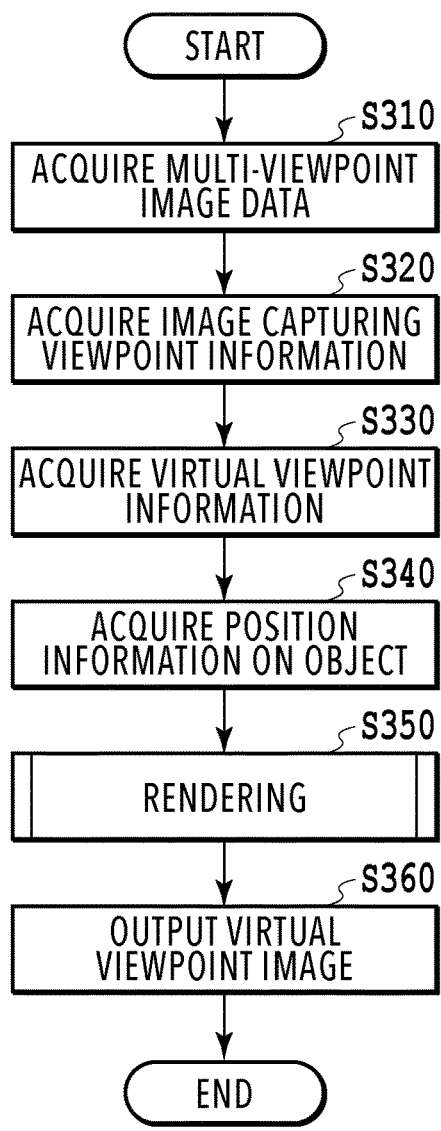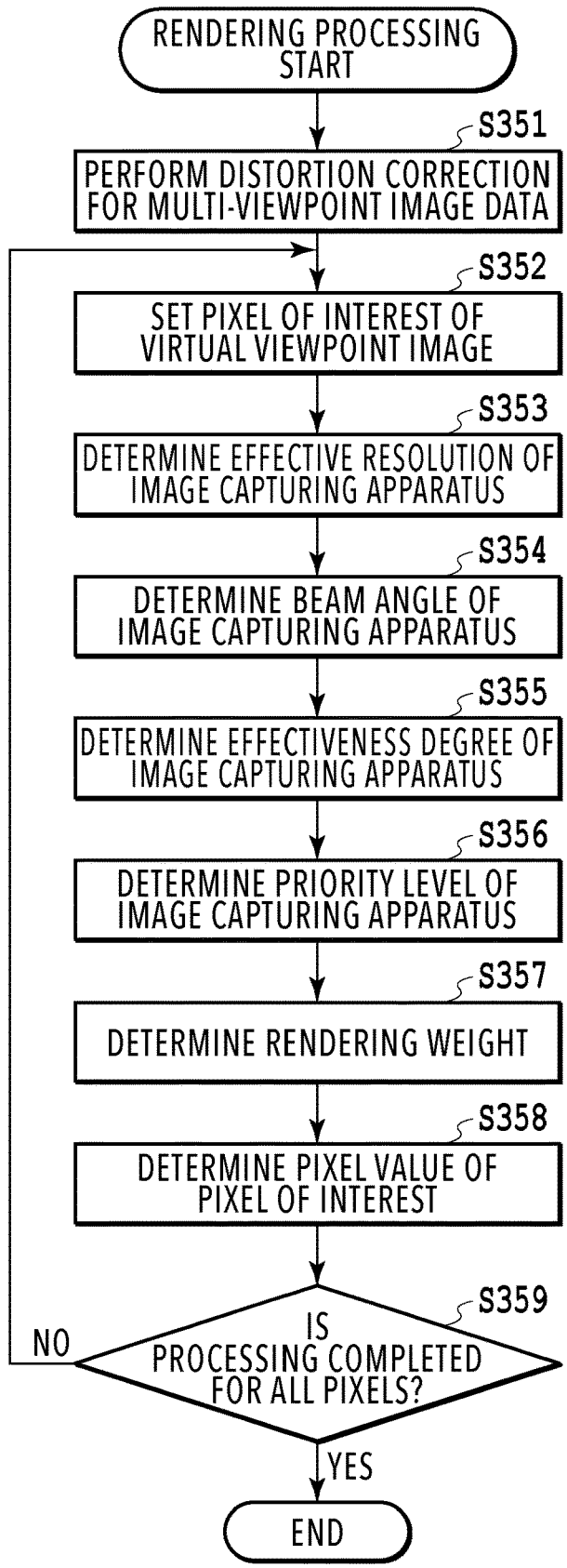

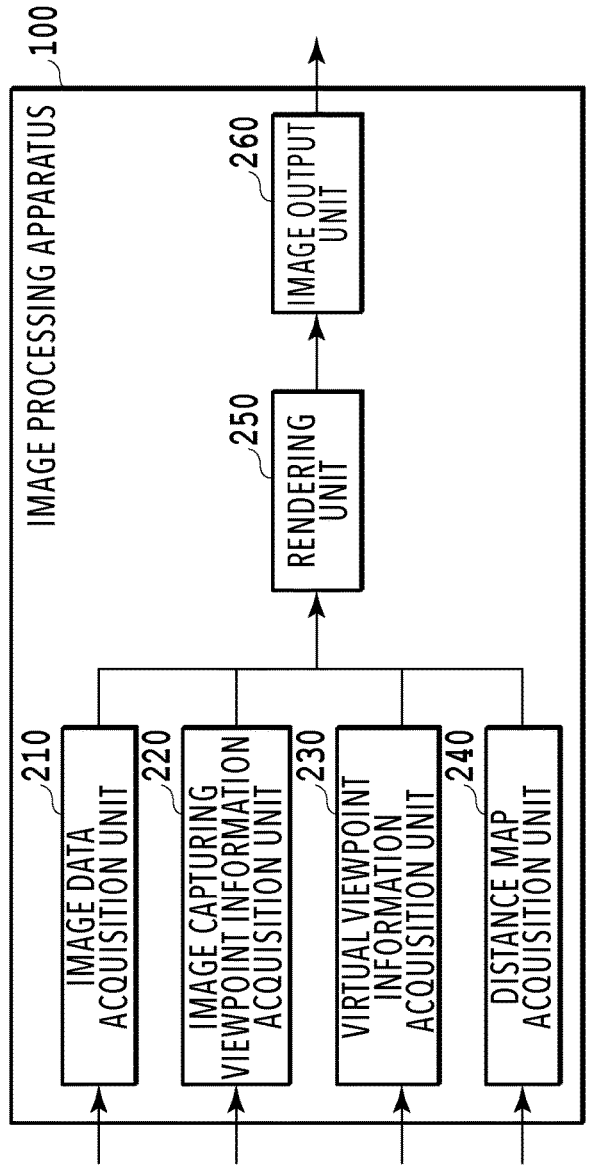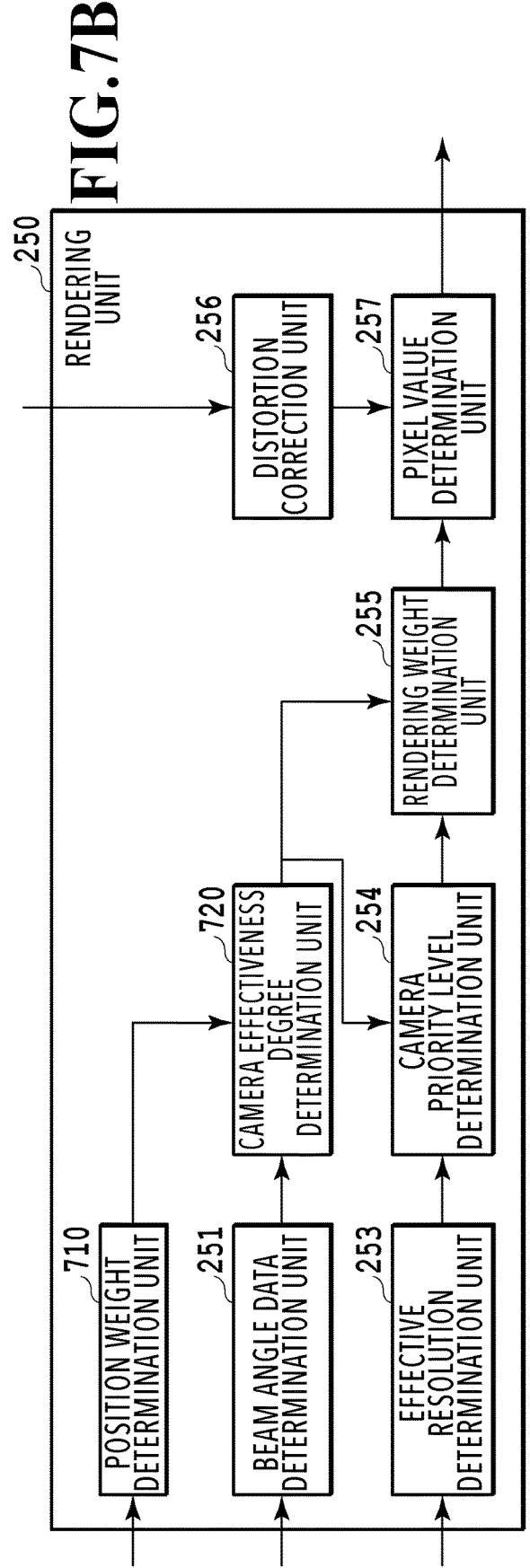

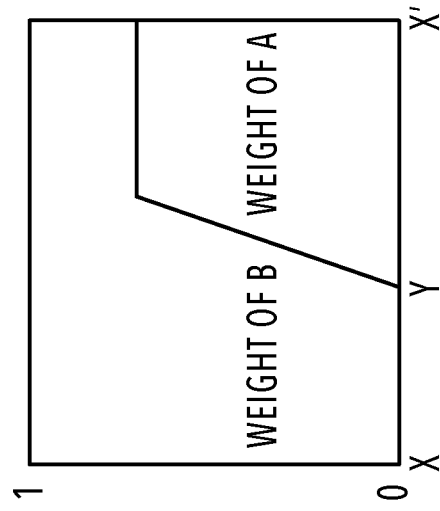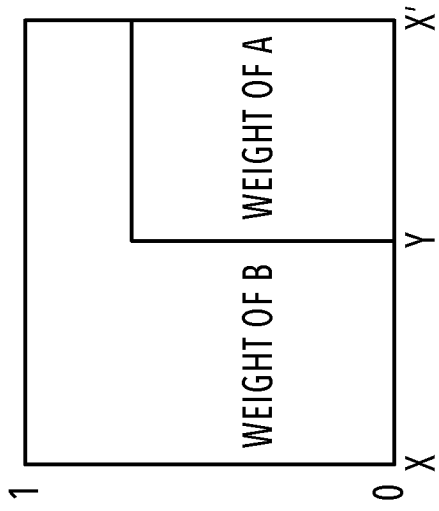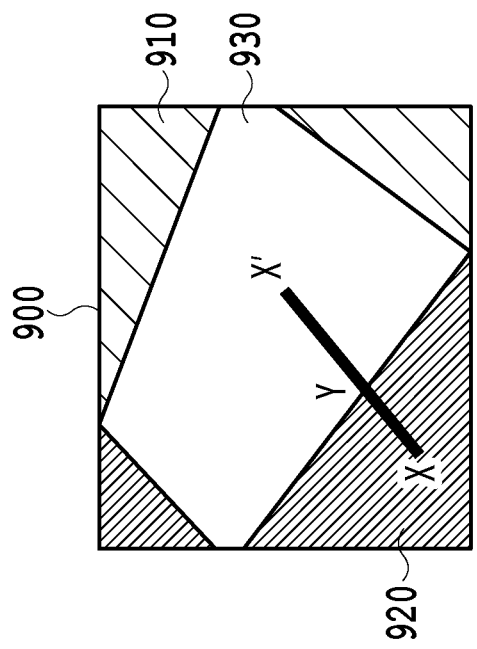

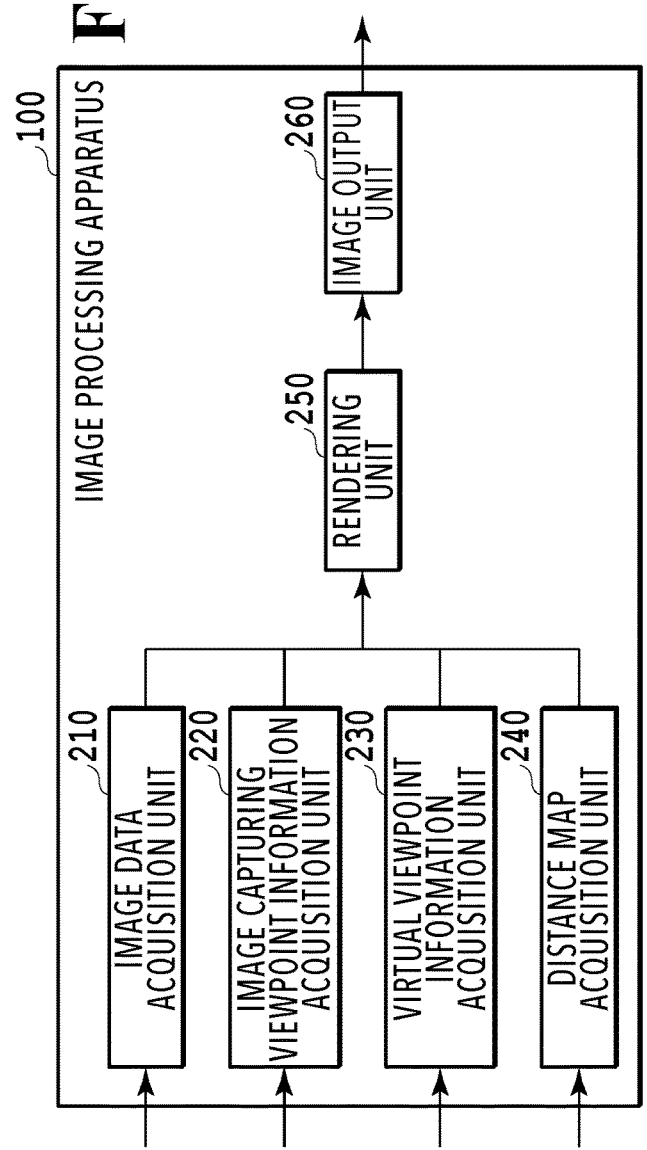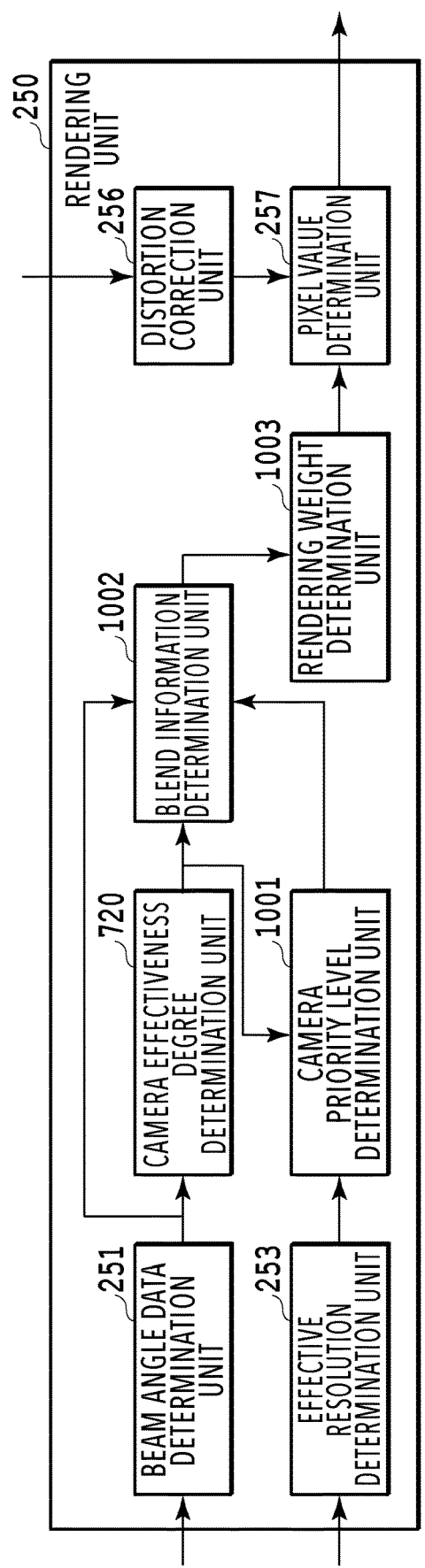

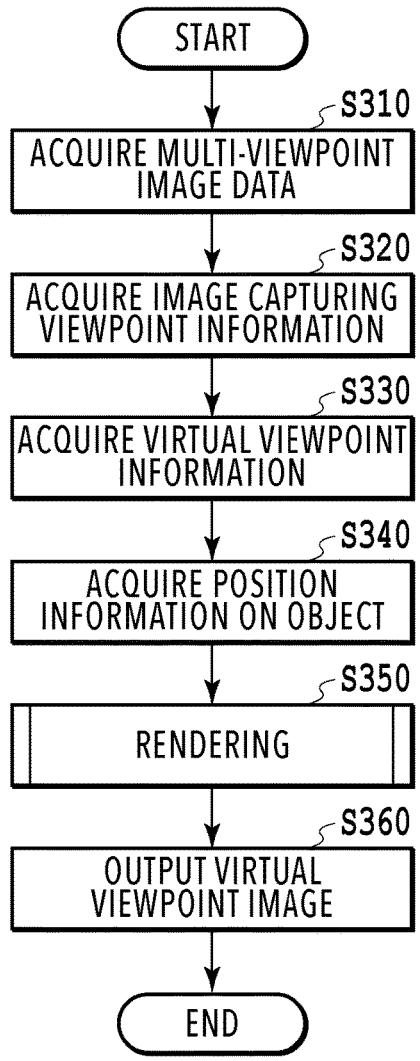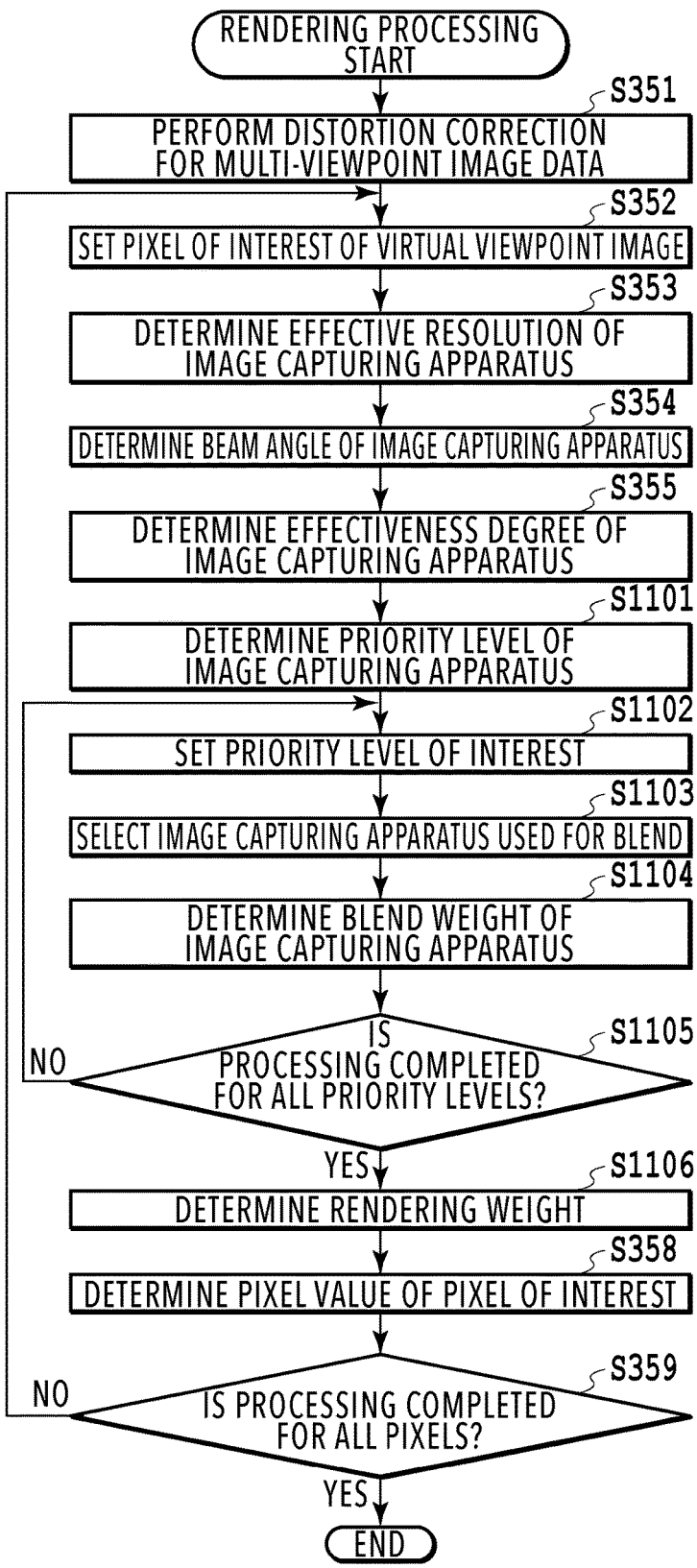

IMAGE PROCESSING APPARATUS, IMAGE PROCESSING METHOD AND STORAGE MEDIUM

BACKGROUND OF THE INVENTION

Field of the Invention

The present disclosure relates to a technique to generate a virtual viewpoint image.

Description of the Related Art

Conventionally, a technique is known which generates an image (virtual viewpoint image) obtained in a case where an object is viewed from a virtual viewpoint, which is an arbitrary viewpoint, from images (multi-viewpoint images) obtained by capturing the object by a plurality of image capturing apparatuses. A virtual viewpoint image is generated by combining multi-viewpoint images based on, for example, a matching degree in the line-of-sight direction between the virtual viewpoint and each image capturing apparatus.

Further, Japanese Patent Laid-Open No. 2014-10804 has described a method of generating a virtual viewpoint image by using an effective resolution in a virtual viewpoint image calculated for each image capturing apparatus, in addition to the matching degree in the line-of-sight direction. According to this method, it is possible to suppress a reduction in image quality of a virtual viewpoint image by combining multi-viewpoint images by preferentially using captured images whose effective resolution is high.

However, in the technique described in Japanese Patent Laid-Open No. 2014-10804, a virtual viewpoint image is generated by combining a captured image by an image capturing apparatus whose matching degree in the line-of-sight direction is high and a captured image by an image capturing apparatus whose effective resolution is high without distinguishing them from each other. Because of this, for example, a captured image whose matching degree in the line-of-sight is high but whose effective resolution is low and a captured image whose effective resolution is high are combined, and therefore, the captured image whose effective resolution is high is not made use of sufficiently and there is a case where the image quality of a virtual viewpoint image is degraded.

SUMMARY OF THE INVENTION

In one embodiment of the present disclosure, an image processing apparatus that generates a virtual viewpoint image based on images obtained by capturing an image capturing area from directions different from one another by a plurality of image capturing apparatuses includes: a specification unit configured to specify a relationship between a sight direction from a virtual viewpoint corresponding to the virtual viewpoint image and an image capturing direction of an image capturing apparatus included in the plurality of image capturing apparatuses; a selection unit configured to select one or more image capturing apparatuses from among the plurality of image capturing apparatuses based on the specified relationship and a resolution relating to image capturing by an image capturing apparatus included in the plurality of image capturing apparatuses; and a pixel value determination unit configured to determine a pixel value of the virtual viewpoint image by using a pixel value or pixel values of one or more images obtained based on image capturing by the selected one or more image capturing apparatuses.

Further features of the present disclosure will become apparent from the following description of exemplary embodiments with reference to the attached drawings.

BRIEF DESCRIPTION OF THE DRAWINGS

FIG. 2A is a block diagram showing a function configuration of the image processing apparatus in the first embodiment;

FIG. 2B is a block diagram showing a function configuration of a rendering unit in the first embodiment;

FIG. 3A is a flowchart showing a general flow of virtual viewpoint image generation processing of the first embodiment;

FIG. 3B is a flowchart showing a detailed flow of rendering processing of the first embodiment;

FIG. 7A is a block diagram showing a function configuration of an image processing apparatus in a second embodiment;

FIG. 7B is a block diagram showing a function configuration of a rendering unit in the second embodiment;

FIG. 9A is a diagram showing an example of a virtual viewpoint image of the second embodiment;

FIG. 9B is a diagram showing an example of each weight of captured images along a segment X-X' in FIG. 9A;

FIG. 9C is a diagram showing an another example of each weight of the captured images along the segment X-X' in FIG. 9A;

FIG. 10A is a block diagram showing a function configuration of an image processing apparatus in a third embodiment;

FIG. 10B is a block diagram showing a function configuration of a rendering unit in the third embodiment;

FIG. 11A is a flowchart showing a general flow of virtual viewpoint image generation processing of the third embodiment;

FIG. 11B is a flowchart showing a detailed flow of rendering processing of the third embodiment.

DESCRIPTION OF THE EMBODIMENTS

In the following, embodiments of the present disclosure are explained with reference to the drawings. The following embodiments are not intended to limit the present disclosure and all combinations of features explained in the present embodiments are not necessarily indispensable to the present disclosure. The same configuration is explained by attaching the same symbol.

First Embodiment

Figure 4:
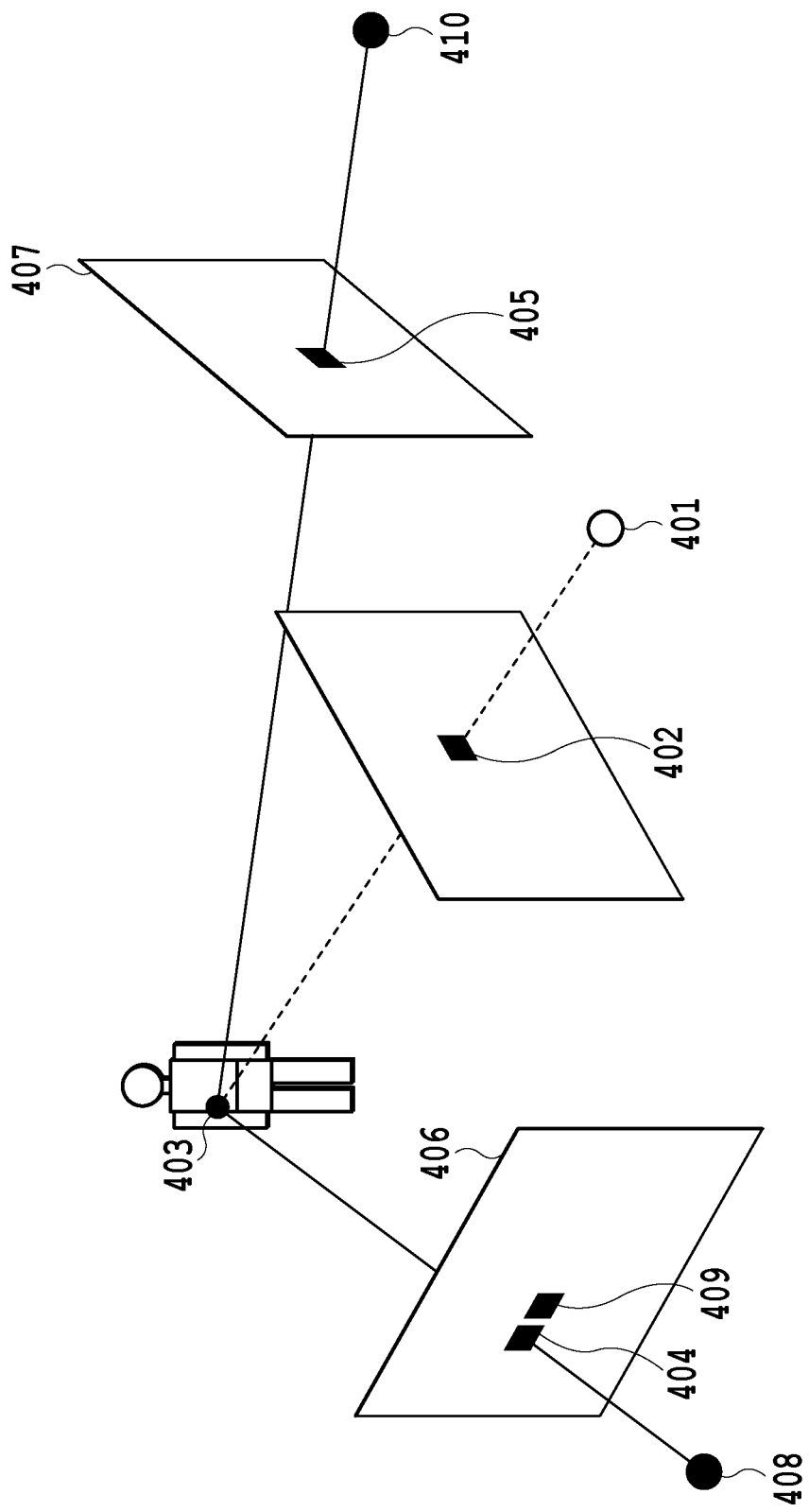
FIG. 4 is a diagram explaining a concept of the virtual viewpoint image generation processing of the first embodiment.

In the following, images obtained by capturing an image capturing area from directions different from one another by a plurality of image capturing apparatuses are called multi-viewpoint image data. The multi-viewpoint image data may be the captured image itself or may be data obtained by performing predetermined image processing for the captured image. First, with reference to FIG. 4, an outline of rendering processing for generating a virtual viewpoint image, which is performed in the present embodiment, is explained.

In the rendering processing in the present embodiment, by using position information on a virtual viewpoint 401 located at an arbitrary viewpoint position and three-dimensional shape data of an object, a region 403 of the object corresponding to a pixel 402 on a virtual viewpoint image, which is a rendering target, is specified. After that, from multi-viewpoint image data, image data (406, 407) including pixels (404, 405) having captured the specified region 403 is detected and rendering is performed for the pixel value of the pixel 402 of the virtual viewpoint image by using the detected image data. In the present embodiment, rendering is performed for the pixel value of the virtual viewpoint image by limiting the image data used for rendering based on an effectiveness degree of the image capturing apparatus based on beam angle data of the virtual viewpoint and the image capturing apparatus, and the effective resolution of the image capturing apparatus. The effectiveness degree of the image capturing apparatus is an example of a first evaluation value relating to the image capturing apparatus.

In the present embodiment, beam angle data indicating a relationship between the sight direction from a virtual viewpoint (direction of line-of-sight associated with a virtual viewpoint) and the image capturing direction of an image capturing viewpoint is calculated for each image capturing apparatus. The beam angle data is, for example, data representing the angle difference between the line-of-sight direction (image capturing direction) of the image capturing viewpoint indicating the direction of the region 403 of the object viewed from an image capturing apparatus 408 and the line-of-sight direction of the virtual viewpoint indicating the direction of the region 403 of the object viewed from the virtual viewpoint 401. Next, based on the calculated beam angle data, the effectiveness degree of the image capturing apparatus for generating a virtual viewpoint image with high image quality is calculated for each image capturing apparatus. Because of the influence of illumination and the like, there is a case where the color on the image data obtained by each image capturing apparatus is different even for the same region of an object. Further, because of the influence of an error included in three-dimensional shape data, there is a case where a pixel 409 shifted from the original pixel 404 is detected erroneously at the time of detecting the pixel corresponding to the region 403 of the object from the image data obtained by the image capturing apparatus. In the case such as this, the pixel value of the virtual viewpoint image for which rendering has been performed represents an unnatural color or erroneous texture, and therefore, image quality is degraded. The larger the angle formed by the line-of-sight direction of the virtual viewpoint and the line-of-sight direction of the image capturing viewpoint, that is, the larger the beam angle data, the greater these influences are. Consequently, in the present embodiment, the smaller the beam angle data of the image capturing apparatus, the higher it is possible to improve the image quality of the virtual viewpoint image, and therefore, the higher the effectiveness degree is set. On the other hand, the larger the beam angle data of the image capturing apparatus, the stronger the possibility that the image quality of a virtual viewpoint image is degraded is, and therefore, the lower the effectiveness degree is set.

Next, the effective resolution of the image capturing apparatus is calculated for each apparatus. The effective resolution indicates the size of the region 403 of the object captured in each image data and the higher the effective resolution of the image capturing apparatus, the higher the resolution with which the object is captured in the image data of the relevant image capturing apparatus. Then, the virtual viewpoint image generated by using the image data with a higher resolution has higher image quality (higher resolution).

Further, based on the effectiveness degree and the effective resolution, which are calculated, image data used for rendering is selected. In the present embodiment, image data is selected in order from the image data captured by the image capturing apparatus whose effective resolution is the highest. Image data is selected until the sum of the effectiveness degrees of the image capturing apparatuses corresponding to the selected image data exceeds the maximum value (for example, 1) of the effectiveness degree. For example, it is assumed that the effective resolution of the image capturing apparatus 408 is the highest and the effective resolution of an image capturing apparatus 410 is the second highest of all the image capturing apparatuses. In a case where the effectiveness degree of the image capturing apparatus 408 is 1, which is the maximum value, only the image data 406 captured by the image capturing apparatus 408 is selected. Further, in a case where the effectiveness degree of the image capturing apparatus 408 is 0.8 and the effectiveness degree of the image capturing apparatus 410 is 0.6, the image data 406 and the image data 407 captured by the image capturing apparatus 410 are selected.

Lastly, a weight (blend weight) used for rendering is determined for each piece of the selected image data and the pixel values of the selected image data are blended (combined) based on the determined weights and rendering is performed for the pixel value of the virtual viewpoint image. In the present embodiment, the weight used for rendering is determined based on the effectiveness degree of the image capturing apparatus. Basically, the effectiveness degree of the image capturing apparatus is taken as the weight used for rendering. In an exceptional case where the sum of the effectiveness degrees corresponding to the selected image data is larger than the maximum value of the effectiveness degree, the weight of the image data whose effectiveness degree is the minimum of the selected image data is adjusted and set so that the sum of the weights used for rendering of all the image data does not exceed the maximum value of the effectiveness degree. In a case where only the image data 406 captured by the image capturing apparatus 408 is selected along the example described above, rendering is performed for the pixel value of the virtual viewpoint by taking the rendering weight of the image data 406 as 1.0. Further, in a case where the image data 406 and 407 is selected, the pixel values of the virtual viewpoint are blended by taking the rendering weight of the image data 406 whose effective resolution is the maximum as 0.8 similar to the effectiveness degree and the rendering weight of the image data 407 as 0.2, which is 1.0-0.8. It is possible to generate a virtual viewpoint image with high image quality by determining the degree (blend weight) in which image data is blended based on the effectiveness degree by limiting images to those whose effective resolution and effectiveness degree contributing to image quality are high as described above.

Figure 1:
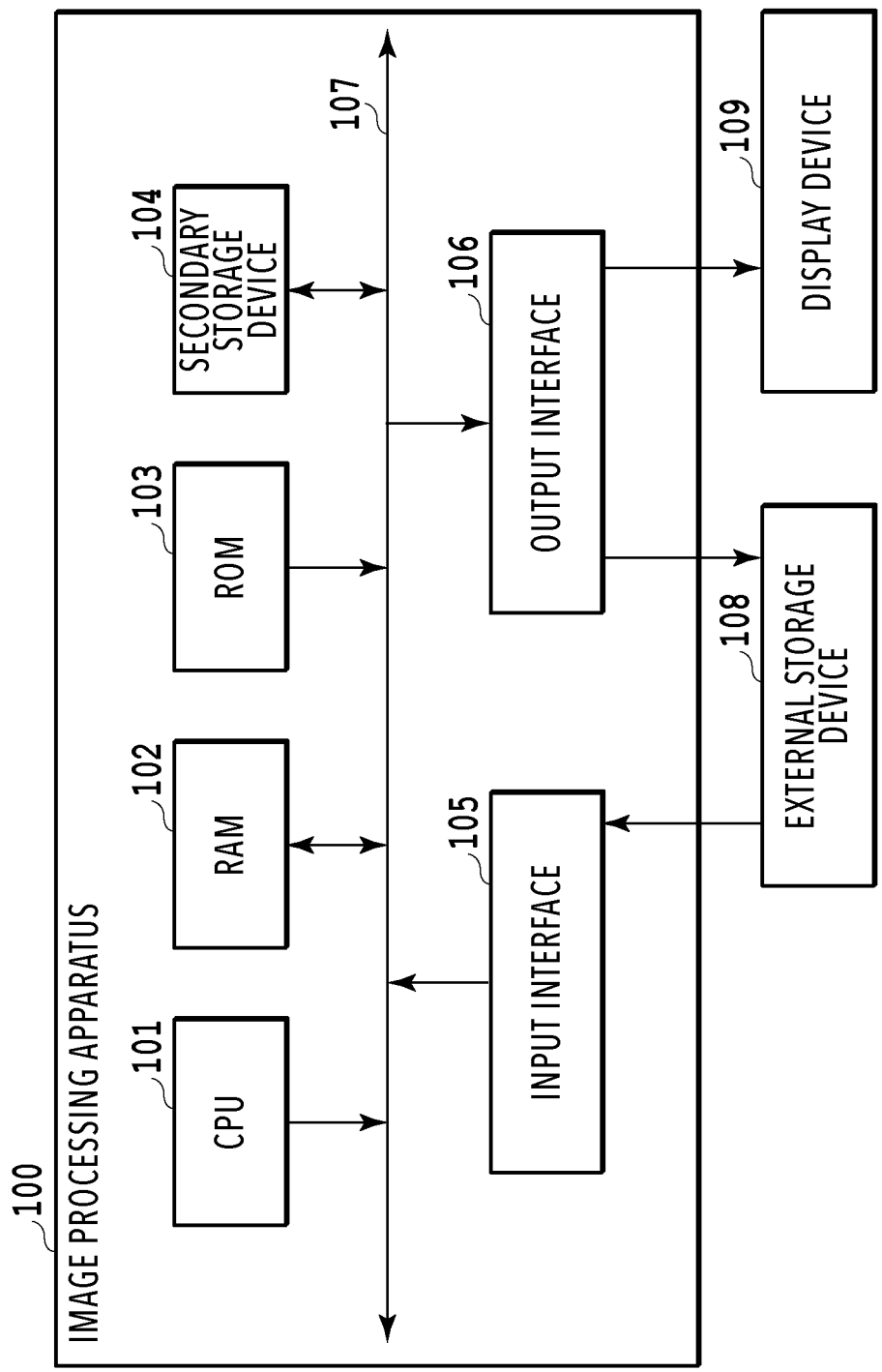
FIG. 1 is a block diagram showing a hardware configuration of an image processing apparatus in a first embodiment.

In the following, a specific configuration of the present embodiment is described. FIG. 1 is a diagram showing an example of the hardware configuration of an image processing apparatus of the present embodiment. An image processing apparatus 100 includes a CPU 101, a RAM 102, a ROM 103, a secondary storage device 104, an input interface 105, and an output interface 106. Each constituent unit of the image processing apparatus 100 is connected to one another by a system bus 107. Further, the image processing apparatus 100 is connected to an external storage device 108 via the input interface 105 and connected to the external storage device 108 and a display device 109 via the output interface 106.

The CPU 101 is a processor that executes programs stored in the ROM 103 by using the RAM 102 as a work memory and centralizedly controls each constituent unit of the image processing apparatus 100 via the system bus 107. Due to this, a variety of kinds of processing, to be described later, are performed.

The secondary storage device 104 is a storage device that stores various kinds of data handled by the image processing apparatus 100 and an HDD is used in the present embodiment. It is possible for the CPU 101 to write data to the secondary storage device 104 and read data stored in the secondary storage device 104 via the system bus 107. As the secondary storage device 104, it is possible to use a variety of storage devices, such as an optical disc drive and a flash memory, in addition to an HDD.

The input interface 105 is a serial bus interface, for example, such as USB and IEEE 1394, and the input of data, commands, and the like from the external device to the image processing apparatus 100 is performed via the input interface 105. The image processing apparatus 100 acquires data from the external storage device 108 (for example, storage media, such as hard disk, memory card, CF card, SD card, and USB memory) via the input interface 105. It is also possible to connect an input device, such as a mouse and a button, not shown schematically, to the input interface 105.

The output interface 106 includes a serial bus interface, such as USB and IEEE 1394, like the input interface 105. In addition, it is also possible to use a video image output terminal, for example, such as DVI and HDMI (registered trademark). The output of data and the like from the image processing apparatus 100 to the external device is performed via the output interface 106. It is possible for the image processing apparatus 100 to output and display processed images and the like on the display device 109 (various kinds of image display device, such as liquid crystal display) via the output interface 106. Components of the image processing apparatus 100 exist other than those described above, but explanation is omitted here.

In the following, with reference to FIG. 2A to FIG. 3B, virtual viewpoint image generation processing performed by the image processing apparatus 100 of the present embodiment is explained in more detail. FIG. 2A is a block diagram showing the function configuration of the image processing apparatus 100. FIG. 2B is a block diagram showing the function configuration of a rendering unit 250 in the image processing apparatus 100. FIG. 3A is a flowchart showing a general flow of the virtual viewpoint image generation processing of the present embodiment. FIG. 3B is a flowchart showing a detailed flow of rendering processing in the virtual viewpoint image generation processing.

The image processing apparatus 100 functions as each constituent unit shown in FIG. 2A and FIG. 2B by the CPU 101 executing the programs stored in the ROM 103 by using the RAM 102 as a work memory and performs the series of processing shown in the flowchart in FIG. 3A and FIG. 3B. It is not necessary for all the processing shown in the following to be performed by the CPU 101 and it may also be possible to perform part or all of the processing by one or a plurality of processing circuits (that is, hardware, such as ASIC and electronic circuit) other than the CPU 101. Symbol "S" in explanation of each piece of processing means a step in the flowchart. This is also true with other flowcharts. In the following, with reference to FIG. 3A, a flow of the virtual viewpoint image generation processing performed by each constituent unit of the image processing apparatus 100 is explained.

Figure 5:
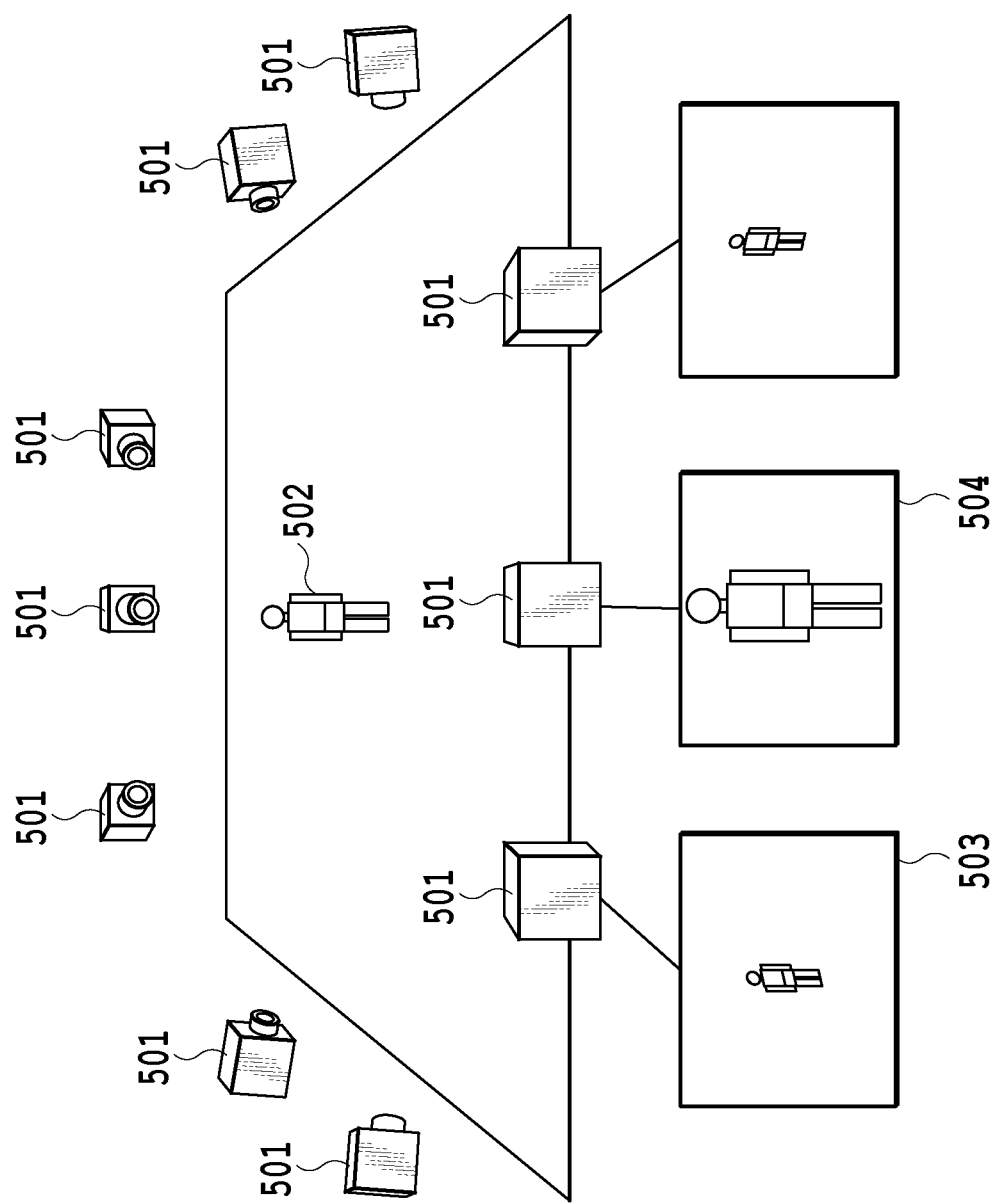
FIG. 5 is a diagram explaining a configuration of image capturing apparatuses of the first embodiment.

At S310, an image data acquisition unit 210 acquires multi-viewpoint image data obtained by capturing an object from a plurality of different viewpoints by a plurality of image capturing apparatuses via the input interface 105 or from the secondary storage device 104. The multi-viewpoint image data is acquired, for example, from a plurality of image capturing apparatuses 501 arranged so as to surround an object 502 in FIG. 5. In the present embodiment, as shown in FIG. 5, the plurality of the image capturing apparatuses 501 is arranged so as to face the ground surface (floor surface) from above. Further, it is possible for each image capturing apparatus to include lenses whose viewing angle and focal length are different (may be zoom lens) and the size of the object captured on an image may be different for each image capturing apparatus, such as a captured image 503 and a captured image 504. The arrangement of the image capturing apparatuses shown in FIG. 5 and the configuration of lenses to be included are merely exemplary and it may also be possible to acquire multi-viewpoint image data by using another configuration. Further, the image processing apparatus 100 may be connected with a plurality of image capturing apparatuses and may be configured as an image processing system including the image processing apparatus 100 and the plurality of image capturing apparatuses. According to the configuration such as this, it is possible to generate a virtual viewpoint image from a virtual viewpoint real time. In the present embodiment, a case is explained as an example where the multi-viewpoint image data that is acquired is a three-channel color image of RGB. It is also possible to apply the present embodiment similarly to a case where the multi-viewpoint image data is one-channel gray image or moving image data. In a case where the multi-viewpoint image data is moving image data, it is possible for the image processing apparatus 100 to perform the following processing by using frame images captured substantially at the same time by a plurality of image capturing apparatuses Further, the image data acquisition unit 210 stores each image in association with a number (hereinafter, image capturing apparatus number) distinguishing an image capturing apparatus from another in order to distinguish each image of the multi-viewpoint image data from another. The image data acquisition unit 210 outputs the multi-viewpoint image data to the rendering unit 250.

At S320, an image capturing viewpoint information acquisition unit 220 acquires position/orientation information (hereinafter, called image capturing viewpoint information) of a plurality of image capturing apparatuses having captured the multi-viewpoint image data acquired by the image data acquisition unit 210 for each image capturing apparatus. In the present embodiment, the image capturing viewpoint refers to each viewpoint of the plurality of the image capturing apparatuses 501 and the image capturing viewpoint information means information on the image capturing viewpoint. In the image capturing viewpoint information, the position/orientation information on the image capturing apparatus 501 within a predetermined coordinate system and for example, position information on the image capturing apparatus 501 and orientation information indicating the optical axis direction are included. Further, it is also possible to include information relating to the viewing angle of the image capturing apparatus 501, such as the focal length or the main point position of the image capturing apparatus 501, in the image capturing viewpoint information. It is possible to associate each pixel of the captured image and the position of the object existing within the captured image by using these pieces of information. Because of this, it is made possible to specify the corresponding pixel on the captured image and obtain color information thereon for the specific region of the object. Further, it is possible to include image capturing parameters, such as the distortion parameter indicating a distortion of an image captured by the image capturing apparatus 501, the F-number (aperture value), the shutter speed, and the white balance, in the image capturing viewpoint information. The image capturing viewpoint information acquisition unit 220 outputs the image capturing viewpoint information to the rendering unit 250.

At S330, a virtual viewpoint information acquisition unit 230 acquires information (hereinafter, called virtual viewpoint information) relating to a virtual viewpoint. The virtual viewpoint refers to the viewpoint of a virtual viewpoint image generated by the image processing apparatus 100 and the virtual viewpoint information means information about a virtual viewpoint. In the virtual viewpoint information, as in the case with the image capturing viewpoint information, position/orientation information on a virtual viewpoint within a predetermined coordinate system is included and for example, position information on a virtual viewpoint and orientation information indicating the optical axial direction are included. Further, it is also possible to include viewing angle information from a virtual viewpoint, resolution information on a virtual viewpoint image, and the like in the virtual viewpoint information. Furthermore, it is also possible to include the distortion parameter, the image capturing parameter, and the like in the virtual viewpoint information. The virtual viewpoint information acquisition unit 230 outputs the virtual viewpoint information to the rendering unit 250.

At S340, a distance map acquisition unit 240 acquires position information on the object within the space. This position information indicates a relative position relationship between the virtual viewpoint and the object. In the present embodiment, the distance map acquisition unit 240 acquires position information on the object as a distance map (depth map) from the virtual viewpoint to the object. A method of generating a distance map based on the captured images of an object obtained by a plurality of image capturing apparatuses is publicly known and it is possible to adopt an arbitrary method. For example, it is possible to generate a three-dimensional model of an object by using the visual volume intersection method or the stereo matching method. Then, based on a relationship between the virtual viewpoint and the three-dimensional model of the object, for each pixel of the virtual viewpoint image, it is possible to generate a distance map by finding the distance from the virtual viewpoint to the corresponding object. The generation method of a distance map is not limited to this and it may also be possible to generate a distance map based on a three-dimensional model by generating the three-dimensional model of an object by using some tracker or the like. Further, it may also be possible to acquire a distance map by measuring in advance the distance from the virtual viewpoint to the corresponding object by a range sensor or the like. The distance map acquisition unit 240 outputs the acquired distance map to the rendering unit 250.

At S350, the rendering unit 250 determines the pixel value of each pixel of the virtual viewpoint image (that is, performs rendering) by using the acquired data and information, that is, the multi-viewpoint image data, the image capturing viewpoint information, the virtual viewpoint information, and the object position information (for example, distance map). The rendering unit 250 acquires the color information on the object existing in the direction of interest from the virtual viewpoint from each piece of the multi-viewpoint image data. Then, the rendering unit 250 determines the color information on the object existing in the direction of interest by combining the acquired color information by using a weight determined in accordance with the effectiveness degree of the image capturing apparatus based on the beam angle of the image capturing viewpoint and the virtual viewpoint and the effective resolution of the multi-viewpoint image data as will be described later. The rendering unit 250 generates a virtual viewpoint image by determining the color information on the object for each direction of interest corresponding to each pixel of the virtual viewpoint image in this manner. In the following, the generation method of a virtual viewpoint image (that is, rendering processing) is explained specifically.

First, the pixel of interest in the virtual viewpoint image is determined and the position of the object captured in the pixel of interest is calculated by equation (1).

$$\begin{pmatrix} x_0 \\ y_0 \\ z_0 \end{pmatrix} = \frac{d_0(u_0, v_0)}{f_0} \begin{pmatrix} u_0 - c_{x0} \\ v_0 - c_{y0} \\ f_0 \end{pmatrix} \quad (1)$$

Here, $(x_0, y_0, z_0)$ indicates the position of the object in the camera coordinates and $(u_0, v_0)$ indicates the coordinates of the pixel of interest in the virtual viewpoint image. Further, $d_0(u_0, v_0)$ indicates the distance from the virtual viewpoint to the object captured in the pixel of interest, which is indicated in the distance map. Furthermore, $f_0$ indicates the focal length of the virtual viewpoint and $c_{x0}$ and $c_{y0}$ indicate the main point position of the virtual viewpoint.

Next, for the object captured in the pixel of interest, the camera coordinates at the virtual viewpoint are converted into the world coordinates in accordance with equation (2).

$$\begin{pmatrix} X_0 \\ Y_0 \\ Z_0 \end{pmatrix} = R_0^{-1} \begin{pmatrix} x_0 \\ y_0 \\ z_0 \end{pmatrix} + \begin{pmatrix} X_{output} \\ Y_{output} \\ Z_{output} \end{pmatrix} \quad (2)$$

Here, $(X_0, Y_0, Z_0)$ indicates the position of the object in the world coordinates. $R_0$ indicates the optical axis direction of the virtual viewpoint. Further, $(X_{output}, Y_{output}, Z_{output})$ indicates the camera position of the virtual viewpoint in the world coordinates.

Further, the coordinates on the captured image from the image capturing viewpoint, in which the object existing at the world coordinates ($X_0$, $Y_0$, $Z_0$) is captured, are calculated in accordance with equation (4) obtained by solving equation (3).

$$\begin{pmatrix} X_0 \\ Y_0 \\ Z_0 \end{pmatrix} = tR_i^{-1} \begin{pmatrix} u_i - c_{xi} \\ v_i - c_{yi} \\ f_i \end{pmatrix} + \begin{pmatrix} X_{cam,i} \\ Y_{cam,i} \\ Z_{cam,i} \end{pmatrix} \quad (3)$$

Here, $R_i$ indicates the optical axis direction of an image capturing viewpoint i. The image capturing viewpoint i is the number of the image capturing apparatus for distinguishing the multi-viewpoint image data from another, which is described above. Further, ($X_{cam,i}$, $Y_{cam,i}$, $Z_{cam,i}$) indicates the camera position of the image capturing viewpoint i. Further, $f_i$ indicates the focal length of the image capturing viewpoint i and $c_{xi}$ and $c_{yi}$ indicate the main point position of the image capturing viewpoint i. Further, t indicates a constant. By solving equation (3) with respect to ($u_i$, $v_i$), equation (4) is obtained.

$$\begin{pmatrix} u_i - c_{xi} \\ v_i - c_{yi} \\ f_i \end{pmatrix} = t^{-1} R_i + \begin{pmatrix} X_0 - X_{cam,i} \\ Y_0 - Y_{cam,i} \\ Z_0 - Z_{cam,i} \end{pmatrix} \quad (4)$$

It is possible to first find t in accordance with equation (4) and further, it is possible to find ($u_i$, $v_i$) by using the obtained t. In this manner, it is possible to convert the coordinates ($u_0$, $v_0$) of the pixel of interest in the virtual viewpoint image into the coordinates ($u_i$, $v_i$) of the pixel in the captured image. The possibility that the pixel of interest ($u_0$, $v_0$) in the virtual viewpoint image and the pixel ($u_i$, $v_i$) in the captured image correspond to the same object is strong. Consequently, it is possible to use the pixel value (color information) of the pixel ($u_i$, $v_i$) in the captured image as the pixel value (color information) of the pixel of interest ($u_0$, $v_0$) in the virtual viewpoint image.

In the present embodiment, the rendering unit 250 specifies the pixel ($u_i$, $v_i$) (i is the number equal to that of image capturing apparatuses) corresponding to the pixel of interest ($u_0$, $v_0$) from the multi-viewpoint image data. Then, the rendering unit 250 determines the pixel value by weighted combination by limiting the pixels to be used of the specified pixels and using them. In the following, with reference to FIG. 3B, a flow of rendering processing is explained in detail.

At S351, a distortion correction unit 256 performs distortion correction for the multi-viewpoint image data acquired by the image data acquisition unit 210 and outputs the multi-viewpoint image data after the distortion correction to a pixel value determination unit 257. For example, it is possible for the distortion correction unit 256 to perform distortion correction processing by referring to the distortion parameter of each image capturing apparatus, which is acquired by the image capturing viewpoint information acquisition unit 220. By generating a virtual viewpoint image by using the multi-viewpoint image data for which distortion correction has been performed, it is made possible to generate a virtual viewpoint image with high image quality, which hardly has a feeling of incongruity. However, the rendering unit 250 including the distortion correction unit 256 is not indispensable.

At S352, the pixel value determination unit 257 determines the pixel of pixel, which is the target for which the pixel value is determined on the virtual viewpoint image. In the present embodiment, the leftmost and uppermost pixel in the virtual viewpoint image is selected as the first pixel of interest. After this, each time determination of the pixel value is completed, a pixel not selected as the pixel of interest so far is selected as the new pixel of interest in the downward to the right direction. The order of selection of the pixel of interest is not limited to this and it may also be possible to determine the pixel of interest in any order.

At S353, an effective resolution determination unit 253 determines the effective resolution of the pixel of interest for each image capturing apparatus having captured the image data within the multi-viewpoint image data by using the image capturing viewpoint information acquired from the image capturing viewpoint information acquisition unit 220 and the distance map acquired from the distance map acquisition unit 240. In the present embodiment, by using a distance $d_i$ ($u_i$, $v_i$) between the object captured in the pixel of interest ($u_0$, $v_0$) and the image capturing viewpoint, and the focal length $f_i$ of the image capturing apparatus, the effective resolution is determined from $d_i$ ($u_i$, $v_i$)/$f_i$. However, the determination method of the effective resolution is not limited to the above and it may also be possible to use another method of determining a value indicating the size of the object captured in each piece of image data. Further, in the present embodiment, the effective resolution is calculated for each pixel, but it may also be possible to calculate one effective resolution for the captured image and make use thereof. As described above, the higher the effective resolution of the image capturing apparatus, the higher the resolution with which the object is captured in the image captured by the image capturing apparatus. The distance between the object and the image capturing viewpoint is acquired by converting the distance $d_0$ ($u_0$, $v_0$) between the virtual viewpoint and the object, which is acquired from the distance map acquisition unit 240, into the coordinate system of the image capturing viewpoint in equation (5) based on the image capturing viewpoint information.

$$d_i \begin{pmatrix} u_i \\ v_i \\ 1 \end{pmatrix} = R_i \left( d_0(u_0, v_0) R_0^t A_0^{-1} \begin{pmatrix} u_0 \\ v_0 \\ 1 \end{pmatrix} - R_0^t T_0 \right) + T_i \quad (5)$$

Here, $A_0$ indicates an internal parameter matrix of the virtual viewpoint, [$R_0$, $T_0$] indicates an external parameter matrix, $A_i$ indicates an internal parameter of the ith image capturing apparatus, and [$R_i$, $T_i$] indicates an external parameter matrix. The effective resolution determination unit 253 outputs the calculated effective resolution for each image capturing apparatus to a camera priority level determination unit 254.

At S354, a beam angle data determination unit 251 calculates beam angle data of the virtual viewpoint and the image capturing viewpoint for each image capturing apparatus based on the image capturing viewpoint information acquired from the image capturing viewpoint information acquisition unit 220 and the virtual viewpoint information acquired from the virtual viewpoint information acquisition unit 230. Here, the angle formed by the beams of the virtual viewpoint and each image capturing viewpoint is found by projecting the line-of-sight direction of each image capturing viewpoint onto the plane on which the image capturing apparatus is installed and calculating the angle between normalized vectors. The angle formed by the beams is determined as the beam angle data. In this case, the beam angle data is common to all the pixels of the object and the background, but it may also be possible to calculate the beam angle data for each of the object and the background based on the direction of the beam for each pixel. Further, it may also be possible to use data in another aspect, which can specify an angle, such as an inner product, in place of an angle. The beam angle data determination unit 251 outputs the determined beam angle data for each image capturing apparatus to a camera effectiveness degree determination unit 252.

At S355, the camera effectiveness degree determination unit 252 determines the effectiveness degree of the captured image for generating a virtual viewpoint image with high image quality for each image capturing apparatus based on the beam angle data acquired from the beam angle data determination unit 251. As described previously, in the present embodiment, it is possible to make use of an image captured by an image capturing apparatus whose beam angle data is smaller for generating a virtual viewpoint image with higher image quality, and therefore, the effectiveness degree is set high. On the other hand, an image captured by an image capturing apparatus whose beam angle data is larger has a stronger possibility of degrading the image quality of a virtual viewpoint image, and therefore, the effectiveness degree is set low. Specifically, a value $e_i$ found by using equation (6) is determined as the effectiveness degree of an image capturing apparatus.

$$\begin{cases} e_i = 1 & 0 \le |\theta_i| \le \theta_{thr} \\ e_i = \dfrac{\theta_i}{\theta_{thr} - \theta_{max}} - \dfrac{\theta_{max}}{\theta_{thr} - \theta_{max}} & \theta_{thr} < |\theta_i| \le \theta_{max} \\ e_i = 0 & \theta_{max} < |\theta_i| \end{cases} \quad (6)$$

Here, $\theta_i$ indicates beam angle data of the image capturing apparatus i, which is acquired from the beam angle data determination unit 251, and $\theta_{max}$ and $\theta_{thr}$ respectively indicate a maximum angle and an allowable angle, which are determined in advance. The maximum angle $\theta_{max}$ indicates the maximum angle between viewpoints in which it is possible to capture the same region of an object at the virtual viewpoint and the image capturing viewpoint and as the maximum angle $\theta_{max}$, an angle between about 90 degrees and 180 degrees is set. In a case where the beam angle data of an image capturing apparatus is larger than the maximum angle, it is determined that image capturing of the same region of the object at the virtual viewpoint and the image capturing viewpoint is not possible and the effectiveness degree of the image capturing apparatus is set to 0, which is the minimum value. The allowable angle $\theta_{thr}$ indicates the angle between virtual viewpoints in which it is possible to determine that a possibility of having captured the same region of the object at the virtual viewpoint and the image capturing viewpoint is strong and the allowable angle $\theta_{thr}$ is set by taking into consideration the error of the shape estimation and the error of the image capturing viewpoint information. In a case where the beam angle data of an image capturing apparatus is less than or equal to the allowable angle $\theta_{thr}$, the effectiveness degree of the image capturing apparatus is set to 1, which is the maximum value. As described previously, as the angle between viewpoints becomes larger, the influence of the error of the shape estimation becomes greater. Because of this, the effectiveness degree of the image capturing apparatus is found in accordance with equation (6) so that as the beam angle data increases, the effectiveness degree decreases. However, the calculation method of the effectiveness degree is not limited to the above and it may also be possible for the effectiveness degree to decrease nonlinearly as the beam angle data increases. Further, the setting of the allowable angle is not indispensable and it may be possible to use a variety of methods, such as a method of finding the effectiveness degree so that the effectiveness degree decreases as the beam angle data increases by setting the effectiveness degree in a case where the beam angle data is 0 to 1, which is the maximum value. The camera effectiveness degree determination unit 252 outputs the found effectiveness degree for each image capturing apparatus to the camera priority level determination unit 254 and a rendering weight determination unit 255.

At S356, the camera priority level determination unit 254 determines the priority level of the image capturing apparatus used at the time of generating a virtual viewpoint image by using the effectiveness degree and the effective resolution for each image capturing apparatus, which are acquired from the camera effectiveness degree determination unit 252 and the effective resolution determination unit 253, respectively. The priority level of the image capturing apparatus is an example of a second evaluation value relating to the image capturing apparatus. In the present embodiment, first, the image capturing apparatus whose effectiveness degree is larger than the minimum value 0 is selected from among all the image capturing apparatuses. After that, the priority ranking is determined for the selected image capturing apparatus. The image capturing apparatus whose effectiveness degree is the minimum value has a strong possibility of degrading the image quality of a virtual viewpoint image, and therefore, the image capturing apparatus is not used for generation of a virtual viewpoint image and excluded from the target for which the priority ranking of the image capturing apparatus is determined. In the present embodiment, the priority ranking of the image capturing apparatus is determined so that the higher the effective resolution of the selected image capturing apparatus, the higher the priority ranking is set. For example, in a case where the effective resolution of the image capturing apparatus whose number is 3 is the maximum of the selected image capturing apparatuses, the priority ranking of the image capturing apparatus whose number is 3 is set to the first rank. Next, the priority ranking of the image capturing apparatus whose effective resolution is the second highest of the selected image capturing apparatuses is set to the second rank. In this manner, the priority ranking is determined in order and the priority ranking is determined for all the selected image capturing apparatuses. Lastly, the found priority ranking is determined as the priority level of the image capturing apparatus. That is, according to the above-described example, the priority level of the image capturing apparatus whose number is 3 is 1. The representation method of the priority level is not limited to this and it may also be possible to use another representation method capable of determining that the higher the effective resolution of the image capturing apparatus, the higher the priority level is. The camera priority level determination unit 254 outputs the determined priority level for each image capturing apparatus to the rendering weight determination unit 255.

At S357, the rendering weight determination unit 255 determines the weight for each image capturing apparatus at the time of performing rendering for a virtual viewpoint image based on the effectiveness degree and the priority level for each image capturing apparatus, which are acquired from the camera effectiveness degree determination unit 252, and the camera priority level determination unit 254, respectively.

First, a rendering weight W for all the image capturing apparatuses and a sum $W_{sum}$ of the rendering weights of all the image capturing apparatuses are initialized to 0. Next, the image capturing apparatus of interest is set that is the target for which the rendering weight is determined. In the present embodiment, the image capturing apparatus whose priority level is the minimum (that is, the image capturing apparatus whose priority ranking is the highest) of all the image capturing apparatuses is set as the image capturing apparatus of interest. After that, each time the rendering weight is determined, the image capturing apparatus having the minimum priority level of the image capturing apparatuses not selected yet as the image capturing apparatus of interest so far is selected as the new image capturing apparatus of interest. Next, by the sum $W_{sum}$ of the rendering weights of the image capturing apparatuses whose rendering weight has been determined at that point in time, an effectiveness degree $e_j$ of the image capturing apparatus of interest, and equation (7), the rendering weight of the image capturing apparatus of interest is determined. Here, j indicates the number of the image capturing apparatus of interest.

$$\begin{cases} w_j = e_j & w_{sum} + e_j \leq 1 \text{ and } w_{sum} \leq 1 \\ w_j = 1 - W_{sum} & w_{sum} + e_j > 1 \text{ and } w_{sum} \leq 1 \\ w_j = 0 & w_{sum} > 1 \end{cases} \quad (7)$$

By equation (7), the rendering weight for all the image capturing apparatuses is determined in order. The sum of the rendering weights is derived and the rendering weight of the image capturing apparatus whose priority level is after the priority level at the point in time at which the sum becomes larger than 1 is set to 0. By doing so, it is made possible to use the limited number of captured images at the time of rendering. Consequently, it is possible to suppress excessive blending of a plurality of captured images, and therefore, it is made possible to generate a virtual viewpoint image with high image quality. The rendering weight determination unit 255 outputs the determined rendering weight for each image capturing apparatus to the pixel value determination unit 257.

At S358, the pixel value determination unit 257 determines the pixel value of the pixel of interest in a virtual viewpoint image from the rendering weight and the multi-viewpoint image data after distortion correction for each image capturing apparatus, which are acquired from the rendering weight determination unit 255 and the distortion correction unit 256, respectively. The pixel value determination unit 257 extracts the pixel value of the pixel in the captured image after distortion correction corresponding to the pixel of interest in accordance with equation (1) to equation (4). Then, the pixel value determination unit 257 determines the pixel value of the pixel of interest in the virtual viewpoint image data by a sum of products $\Sigma I_i \times W_i$ of a pixel value $I_i$ extracted from each captured image after distortion correction and the rendering weight $W_i$.

At S359, the pixel value determination unit 257 determines whether the pixel value is determined for all the pixels of the virtual viewpoint image data. In a case where the pixel value is determined for all the pixels and the processing of all the pixels is completed, the virtual viewpoint image data is output to the image output unit 260, the rendering processing is terminated, and the processing advances to S360 in FIG. 3A. On the other hand, in a case where the processing of all the pixels is not completed, the processing returns to S352.

At S360, the image output unit 260 outputs the virtual viewpoint image data acquired from the rendering unit 250 to the secondary storage device 104, the external storage device 108, and the display device 109 and the series of processing is completed. The above is the virtual viewpoint image generation processing performed by the image processing apparatus 100 in the present embodiment.

Figure 6:
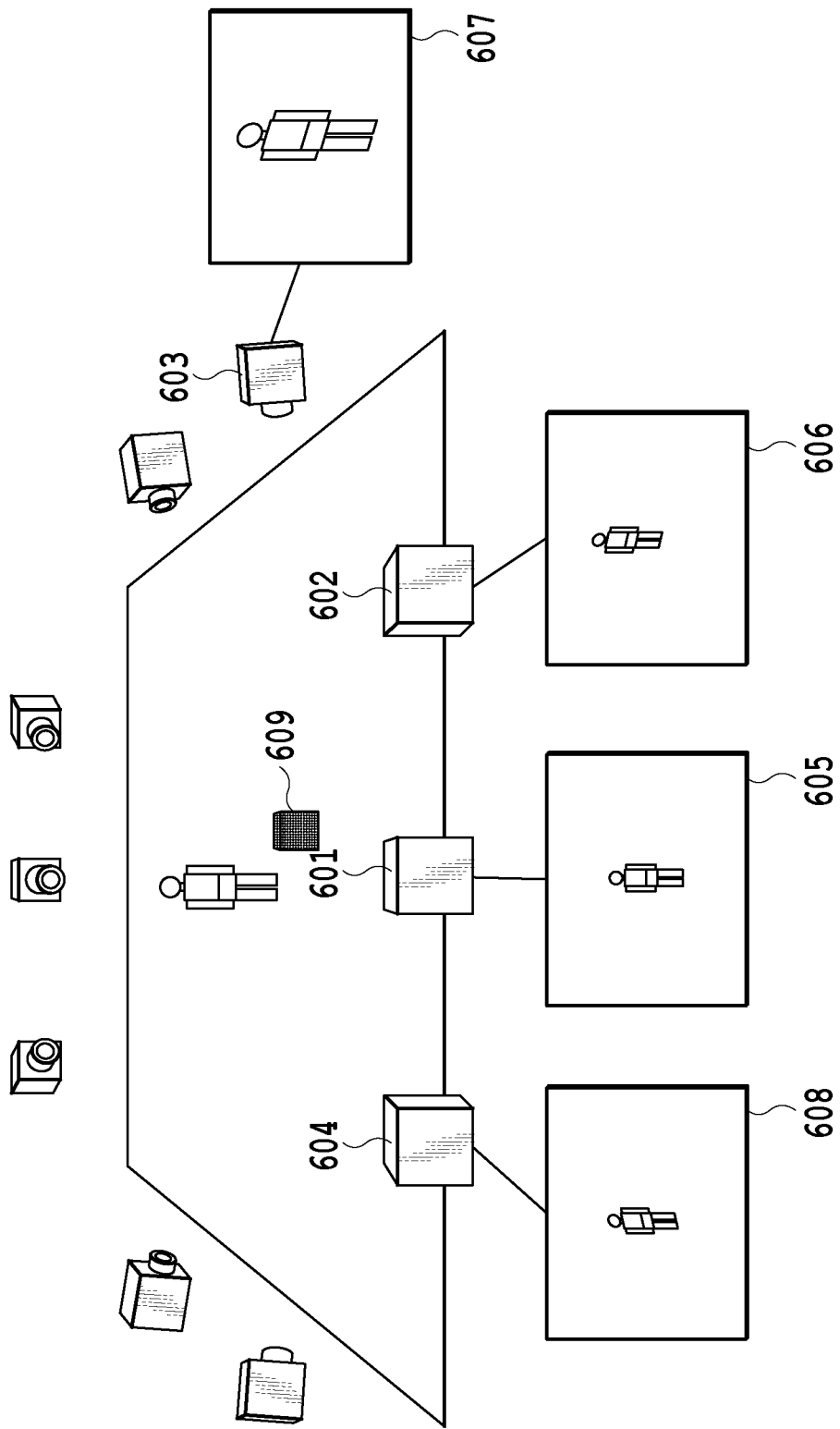
FIG. 6 is a diagram explaining effects of the first embodiment.

In the following, with reference to FIG. 6, the effect of the present embodiment is explained. In FIG. 6, the object of image data 607 is represented larger compared to those of image data 605, 606, and 608. That is, compared to image capturing apparatuses 601, 602, and 604, an image capturing apparatus 603 has a higher resolution.

Here, a case is considered where a virtual viewpoint image at a virtual viewpoint 609 is generated by blending all the image data of the image data 605 to 608 having captured the region of the object captured in the virtual viewpoint image. In this case, for example, on a condition that the results of the weighted sum of the matching degree of the beam angle and the resolution are the same level for the image capturing apparatus 601 and the image capturing apparatus 603, the image data 605 and the image data 607 are blended in an equal ratio. Consequently, it is not possible to make effective use of the resolution of the image data 607, and therefore, the image quality of the generated virtual viewpoint image is degraded.

In contrast to this, in the present embodiment, the image capturing apparatuses are selected in order from the image capturing apparatus whose resolution is the highest until the sum of effectiveness degrees based on the beam angle data becomes a sufficient value and a virtual viewpoint image is generated by blending the image data of the selected image capturing apparatuses. Further, at the time of performing blend, the image of the image capturing apparatus whose resolution is high is used preferentially. Because of this, it is possible to generate a virtual viewpoint image by using mainly the image data 607 whose resolution is high and whose effectiveness degree is sufficiently high. As a result of this, it is possible to generate a virtual viewpoint image with high image quality, which makes effective use of the resolution of the image data 607.

Second Embodiment

In the first embodiment, the images used for rendering are limited based on the effectiveness degree in each image capturing apparatus based on the beam angle of the virtual viewpoint and the image capturing apparatus and the effective resolution in each image capturing apparatus. In the second embodiment, at the time of determining the above-described effectiveness degree in each image capturing apparatus, a position weight of an object is used, in addition to the beam angle. The position weight is a weight for each captured image, which is set in accordance with the position of the object located in a direction of interest within a visual field of the image capturing apparatus. First, with reference to FIG. 9A to FIG. 9C, the significance of the use of the position weight for determination of the effectiveness degree of the image capturing apparatus is explained.

The image capturing range from one image capturing apparatus is limited, and therefore, it is rare for all the objects captured in a virtual viewpoint image are captured in a captured image of one image capturing apparatus. Because of this, it happens frequently that the virtual viewpoint image includes the area that is captured in the captured image from one image capturing apparatus, and therefore, in which the color information on the captured image is reflected, and the area that is not captured in the captured image, and therefore, in which the color information on the captured image is not reflected.

For example, in a virtual viewpoint image 900 shown in FIG. 9A, an area 910 included within the visual field from an input viewpoint A, an area 920 included within the visual field from an input viewpoint B, and an area 930 included within both the visual fields from the input viewpoint A and the input viewpoint B are represented. In other words, the area 910 is an area that is captured only in a captured image A from the input viewpoint A, the area 920 is an area that is captured only in a captured image B from the input viewpoint B, and the area 930 is an area that is captured both in the captured image A and in the captured image B. FIG. 9B shows an example of each weight of the captured image A and the captured image B along a segment X-X' in FIG. 9A. In this example, compared to the input viewpoint B, the orientation of the input viewpoint A is close to the orientation of the output viewpoint, and therefore, a heavier weight is given to the captured image A. As is obvious from FIG. 9B, between the area 930 contributed by the captured image A and the area 920 not contributed by the captured image A, the contribution of the captured image A is greatly different. Because of this, there is a possibility that the color suddenly changes in the vicinity of a boundary Y between the area 920 and the area 930. In the present embodiment, in a case where the object existing in the direction of interest exists on the periphery of the visual field of the image capturing apparatus, a smaller weight is set to the image capturing apparatus than in a case where the object exists at the center portion of the visual field of the image capturing apparatus. In the present embodiment, by the product of the position weight thus set and the beam angle data, the effectiveness degree of the image capturing apparatus is calculated for each image capturing apparatus. Because of this, the effectiveness degree of the image capturing apparatus having captured the object existing on the periphery of the visual field of the image capturing apparatus is lower than that in a case where the object exists at the center portion. As a result of that, at the time of generating a virtual viewpoint image, it is possible to reduce the weight of the use of the captured image captured by the virtual viewpoint image. In the example in FIG. 9C, in the area 930, for the pixel in the vicinity of the boundary Y, a smaller weight is set to the captured image A and a heavier weight is set to the captured image B. Consequently, in the area 930, the contribution of the captured image A becomes smaller in the vicinity of the boundary Y, and therefore, it is possible to make small a change in color in the vicinity of the boundary Y. As a result of that, it is possible to generate a virtual viewpoint image with high image quality.

Figure 8A:
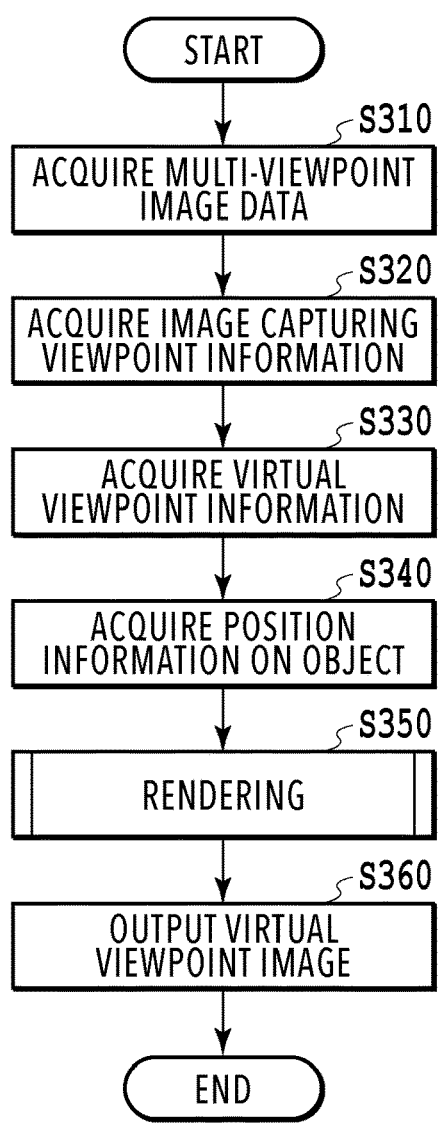
FIG. 8A is a flowchart showing a general flow of virtual viewpoint image generation processing of the second embodiment.
Figure 8B:
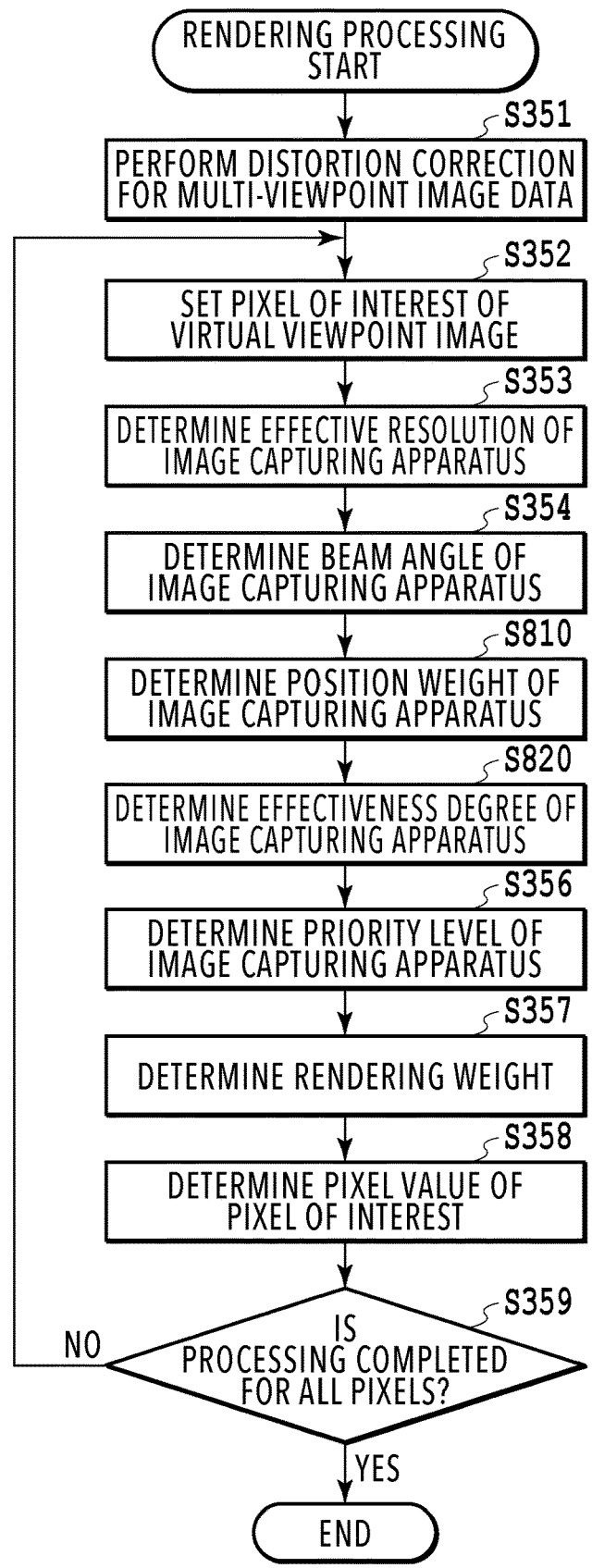
FIG. 8B is a flowchart showing a detailed flow of rendering processing of the second embodiment.

In the following, virtual image generation processing (in particular, rendering processing) in the present embodiment is explained in more detail. It is also possible to perform the virtual image generation processing in the present embodiment by the image processing apparatus 100 having the hardware configuration explained with reference to FIG. 1 in the first embodiment. FIG. 7A is a block diagram showing the function configuration of the image processing apparatus 100 in the present embodiment. FIG. 7B is a block diagram showing the function configuration of a rendering unit 250 in the present embodiment. FIG. 8A is a flowchart showing a general flow of the virtual image generation processing in the present embodiment. FIG. 8B is a flowchart showing a detailed flow of rendering processing in the present embodiment. To the same configuration and processing as those of the first embodiment, the same symbols as those of the first embodiment are attached and explanation thereof is omitted.

At S810, a position weight determination unit 710 determines the position weight at the pixel of interest of the virtual viewpoint image set by the pixel value determination unit 257 at S352 for each image capturing apparatus. In the present embodiment, the position weight is determined by using the distance map acquired from the distance map acquisition unit 240, the image capturing viewpoint information acquired from the image capturing viewpoint information acquisition unit 220, and the virtual viewpoint information acquired from the virtual viewpoint information acquisition unit 230. In the following, the determination method of a position weight is explained specifically. The following processing is performed for each image capturing apparatus.

First, the pixel $(u_i, v_i)$ in the captured image, which corresponds to the pixel of interest $(u_0, v_0)$ at the virtual viewpoint is detected by equation (1) to equation (4).

Next, a block with the pixel $(u_i, v_i)$ detected on the captured image as a center is defined and the pixel included within the block is determined as the pixel that is used at the time of finding a position weight. The block size is determined in accordance with the size of the object in the virtual viewpoint image, the image size of the captured image, and the size of the object.

Next, for the pixel included in the block determined on the captured image, the distance between the object captured in the pixel and the image capturing viewpoint is calculated for each pixel within the block by using equation (5).

Further, the distance of the center pixel of the block is compared with the distance of the pixel other than the center pixel, which is included within the block, and the pixel whose difference in distance is more than or equal to a threshold value determined in advance is detected. Here, the threshold value is used to distinguish the object from the background or distinguish between the objects and as the threshold value, a value substantially larger than the thickness of the body of a person is set.

Lastly, for each pixel whose difference in distance is more than or equal to the threshold value, the pixel distance from the block center is calculated. Then, a value obtained by normalizing the minimum pixel distance of the calculated pixel distances for each pixel with respect to the block size is determined as the position weight of the ith image capturing apparatus in the pixel of interest $(u_0, v_0)$ of the virtual viewpoint image. The calculation method of a position weight is not limited to the above and any method may be used as long as the method is capable of determining whether or not the object captured in the pixel of interest exists on the periphery within the visual field in the captured image. The position weight determination unit 710 outputs the position weight for each image capturing apparatus to a camera effectiveness degree determination unit 720.

At S820, the camera effectiveness degree determination unit 720 determines, for each image capturing apparatus, the effectiveness degree of the captured image for generating a virtual viewpoint image with high image quality based on the beam angle data acquired from the beam angle data determination unit 251 and the position weight acquired from the position weight determination unit 710. As described above, in the present embodiment, it is possible to generate a virtual viewpoint image with higher image quality by using the image captured by the image capturing apparatus whose beam angle data is smaller and the image in which a portion nearer to the center portion within the visual field is captured by the image capturing apparatus, and therefore, the effectiveness degree is set high. On the other hand, the image captured by the image capturing apparatus whose beam angle data is larger or the image in which the periphery within the visual field is captured by the image capturing apparatus has a stronger possibility of degrading the image quality of the virtual viewpoint image, and therefore, the effectiveness degree is set low. Specifically, the value $e_i$ found by using equation (8) is determined as the effectiveness degree of the image capturing apparatus.

$$\begin{cases} e_i = 1 \times p_i(u_0, v_0) & 0 \leq |\theta_i| \leq \theta_{thr} \\ e_i = \left( \frac{\theta_i}{\theta_{thr} - \theta_{max}} - \frac{\theta_{max}}{\theta_{thr} - \theta_{max}} \right) \times p_i(u_0, v_0) & \theta_{thr} < |\theta_i| \leq \theta_{max} \\ e_i = 0 & \theta_{max} < |\theta_i| \end{cases} \quad (8)$$

Here, $\theta_i$, $\theta_{max}$, and $\theta_{thr}$ are the same as those in equation (6) and $p_i$ indicates the position weight of the image capturing number i. For the image capturing apparatus that captures the periphery within the visual field of the image capturing apparatus and has a small position weight, the effectiveness degree decreases by equation (8). The camera effectiveness degree determination unit 252 outputs the found effectiveness degree for each image capturing apparatus to the camera priority level determination unit 254 and the rendering weight determination unit 255.

As explained above, according to the present embodiment, it is possible to generate a virtual viewpoint image with high image quality, which suppresses a sudden change in color at the boundary portion of the area in which different captured images are blended, while making effective use of the resolution of the image capturing apparatus.

Third Embodiment

In the first embodiment, the image and the weight that are used for rendering are controlled based on the effectiveness degree in each image capturing apparatus based on the beam angle of the virtual viewpoint and the image capturing apparatus, and the effective resolution in each image capturing apparatus. By setting the weight used for rendering to 0 for the image capturing apparatus that is not necessary, as well as setting a heavy weight to the image capturing apparatus whose effective resolution and effectiveness degree are high, a virtual viewpoint image is generated by preferentially using the image capturing apparatus whose effective resolution is high. In a third embodiment, the effective resolution and the effectiveness degree are used as the criteria at the time of determining the weight used for rendering and the final weight is determined based on the beam angle data. In the following, the outline and significance of the rendering processing in the present embodiment are explained.

In the present embodiment, first, by the product of the effectiveness degree and the effective resolution, which are determined for each image capturing apparatus, the priority level for selecting the image capturing apparatus for blend is determined. Both the effectiveness degree and the effective resolution indicate that the possibility that it is possible to generate a virtual viewpoint image with high image quality is stronger in a case where the values thereof are higher. Consequently, the higher the priority level of the image capturing apparatus, the stronger the possibility that it is possible to generate a virtual viewpoint image with high image quality is.

Next, for each image capturing apparatus, the image capturing apparatus holding the priority level higher than or equal to the priority level of its own is detected. Then, at least one or more image capturing apparatuses whose beam angle data is small are selected as the image capturing apparatuses used for blend from among the detected image capturing apparatuses. Further, the corresponding priority level is determined as the blend weight.

Lastly, by integrating the blend weights in all the image capturing apparatuses and the selected image capturing apparatuses, the rendering weight is determined for each image capturing apparatus.

Figure 12:
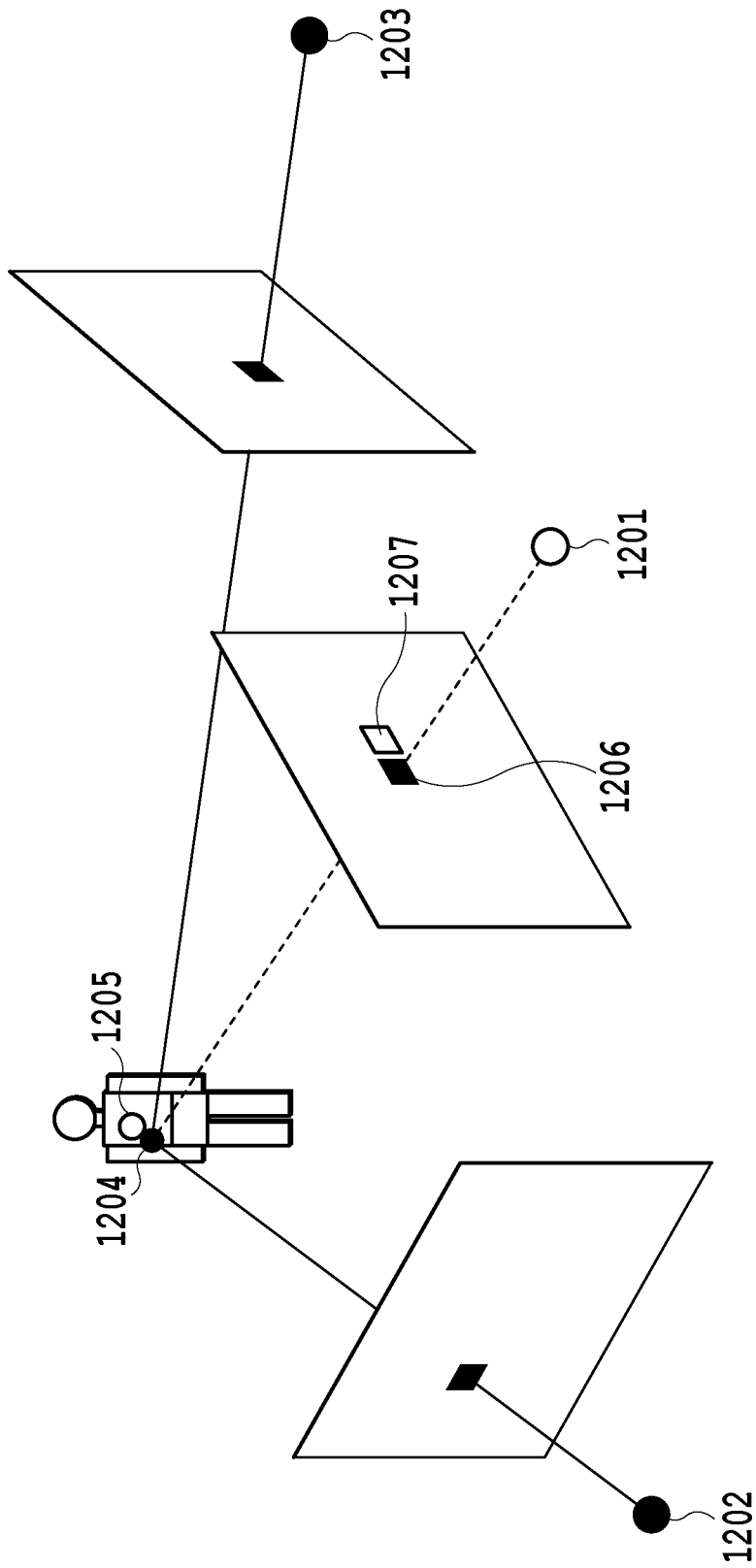
FIG. 12 is a diagram explaining a concept of the virtual viewpoint image generation processing of the third embodiment.

For example, in the camera configuration shown in FIG. 12, on the left side and the right side of a virtual viewpoint 1201, image capturing apparatuses 1202 and 1203 are arranged. Here, it is assumed that both the image capturing apparatuses 1202 and 1203 have substantially the equal effectiveness degree determined based on the beam angle data and effective resolution, and the effectiveness degree holds the maximum value. Further, it is assumed that at a pixel 1206 in an image viewed from the virtual viewpoint 1201, the effective resolution of the image capturing apparatus 1202 of a region 1204 of the corresponding object is higher than that of the image capturing apparatus 1203 and on the other hand, that at a pixel 1207 in an image viewed from the virtual viewpoint 1201, the effective resolution of the image capturing apparatus 1203 of a region 1205 of the corresponding object is higher than that of the image capturing apparatus 1202. In this case, according to the first embodiment, the effectiveness degree of both the image capturing apparatuses is the maximum value, and therefore, rendering is performed for the pixel 1206 by using only the image captured by the image capturing apparatus 1202 and rendering is performed for the pixel 1207 by using only the image captured by the image capturing apparatus 1203. Consequently, both at the pixel 1206 and at the pixel 1207, unnecessary blending is suppressed and it is possible to generate a virtual viewpoint image with high resolution (high image quality).

However, as described above, by the influence of illumination or the like, there is a case where the color on the image data obtained by each image capturing apparatus is different even for the same region of the subject. Further, by the influence of the error included in the three-dimensional shape data, there is a case where a pixel shifted from the pixel that should be detected originally is detected erroneously at the time of detecting the pixel corresponding to the region of the object from the image data obtained by the image capturing apparatus. Because of the difference in texture or color for each image capturing apparatus, there is a possibility that the color or texture suddenly changes at the boundary between the pixel 1206 and the pixel 1207 of the virtual viewpoint image. Consequently, in the third embodiment, the image or the weight used for rendering is not determined only from the effectiveness degree and the effective resolution, but the weight of each image capturing apparatus is determined based on the beam angle data after detecting all the image capturing apparatuses whose priority level reflecting the effectiveness degree and the effective resolution is equal or higher. In the example described above, the image capturing apparatuses 1202 and 1203 whose priority level is equal for the pixel 1206 of the virtual viewpoint image are detected. For the detected image capturing apparatuses, the blend weight based on the beam angle data held by the image capturing apparatus is calculated and the images of the image capturing apparatus 1202 and the image capturing apparatus 1203 are blended based on the calculated blend weights and rendering is performed for the pixel value of the pixel 1206 in the virtual viewpoint image. Due to this, it is possible to reduce the difference in texture or color for each image capturing apparatus. Further, blending is performed by selecting only the image capturing apparatus whose priority level is substantially equal from among all the image capturing apparatuses, and therefore, it is possible to generate a virtual viewpoint image with high resolution (with image quality) by suppressing unnecessary blending.

In the following, the virtual image generation processing (in particular, rendering processing) in the present embodiment is explained in more detail. It is also possible to perform the virtual image generation processing in the present embodiment by the image processing apparatus 100 having the hardware configuration explained with reference to FIG. 1 in the first embodiment. FIG. 10A is a block diagram showing the function configuration of the image processing apparatus 100 in the present embodiment. FIG. 10B is a block diagram showing the function configuration of a rendering unit 250 in the present embodiment. FIG. 11A is a flowchart showing a general flow of the virtual image generation processing in the present embodiment. FIG. 11B is a flowchart showing a detailed flow of rendering processing in the present embodiment. To the same configuration and processing as those of the first embodiment and the second embodiment, the same symbols as those of the first embodiment and the second embodiment are attached and explanation thereof is omitted.

At S1101, a camera priority level determination unit 1001 determines the priority level of the image capturing apparatus for each image capturing apparatus from the effectiveness degree and the effective resolution for each image capturing apparatus, which are acquired from the camera effectiveness degree determination unit 720 and the effective resolution determination unit 253, respectively. In the present embodiment, the product of the effectiveness degree and the effective resolution is determined as the priority level. The representation method of the priority level is not limited to the above and it may also be possible to use another representation method as long as it is possible for the method to reflect a relationship of degree and level of the effectiveness degree and the effective resolution, such as the sum of the effectiveness degree and the effective resolution. The camera priority level determination unit 1001 outputs the determined priority level to a blend information determination unit 1002.

At S1102, the blend information determination unit 1002 selects the priority level of interest from among the priority levels for each image capturing apparatus, which are acquired from the camera priority level determination unit 1001. In the present embodiment, the minimum priority level of all the priority levels is selected as the priority level of interest. After that, each time the processing for the priority level of interest is completed, the higher priority level that is not selected yet as the priority level so far is selected as the new priority level.

At S1103, the blend information determination unit 1002 detects the image capturing apparatus holding the priority level equal to or higher than the priority level of interest among the image capturing apparatuses and selects the image capturing apparatus to be used for blend from among the detected image capturing apparatuses based on the beam angle data acquired from the beam angle data determination unit 251. In the present embodiment, from among the image capturing apparatuses, in each of the clockwise direction from the virtual viewpoint and the counterclockwise direction from the virtual viewpoint, the image capturing apparatus whose beam angle data of the virtual viewpoint and image capturing viewpoint is the minimum is selected. In a case where the example in FIG. 12 is used, a total of two image capturing apparatuses are selected, that is, the image capturing apparatus 1202 is selected as the image capturing apparatus in the clockwise direction and the image capturing apparatus 1203 is selected as the image capturing apparatus in the counterclockwise direction. However, it is not necessarily required to select two image capturing apparatuses and it may also be possible to select one image capturing apparatus whose beam angle data is the minimum from among all the image capturing apparatuses.

At S1104, the blend information determination unit 1002 determines the blend weight for each image capturing apparatus for the image capturing apparatus selected based on the priority level of interest. In the present embodiment, the blend weight is determined so that weight decreases linearly as the angles formed by the virtual viewpoint and the image capturing viewpoints become larger in accordance with the angles formed by the virtual viewpoint and the image capturing viewpoints for the angle formed between the selected image capturing apparatuses. Specifically, in a case where the angle formed between the image capturing apparatuses is taken as $\theta_{sum}$ and the angles formed by the virtual viewpoint and the image capturing viewpoints are taken as $\theta_1$ and $\theta_2$, each blend weight is set as $b_1 = -\theta_1/\theta_{sum}+1$ and $b_2 = -\theta_2/\theta_{sum}+1$. However, the calculation method of the blend weight is not limited to this and it may also be possible to use a variety of methods in which the weight decreases as the angle becomes larger, such as a nonlinear decrease in weight in accordance with the angle and a sudden decrease in weight for angles larger than or equal to a certain angle. The blend information determination unit 1002 determines the number of the image capturing apparatus selected based on the priority level of interest and the blend weight for each of the image capturing apparatuses as the blend information for the priority level of interest.

At S1105, the blend information determination unit 1002 determines whether the blend information is determined for all the priority levels acquired from the camera priority level determination unit 1001. In a case where the blend information is determined for all the priority levels, the processing advances to S1106 and the blend information determined for each priority level is output to a rendering weight determination unit 1003. On the other hand, in a case where the blend information is not determined for all the priority levels, the processing returns to S1102.

At S1106, the rendering weight determination unit 1003 determines the rendering weight for each image capturing apparatus by integrating the blend information for each priority level acquired from the blend information determination unit 1002. In the present embodiment, first, the rendering weights of all the image capturing apparatuses are initialized by 0. After that, the blend information at all the priority levels is checked for each image capturing apparatus and the priority level in which the number of the image capturing apparatus of its own is detected. Then, for each detected priority level, the product of the priority level and the blend weight of the image capturing apparatus of its own is found. Lastly, at all the detected priority levels, the total sum of the products of the priority level and the blend weight, which is found for each priority level, is derived and the result is determined to be the rendering weight of the image capturing apparatus. The rendering weight determination unit 1003 outputs the determined rendering weight to the pixel value determination unit 257.

As explained above, according to the present embodiment, it is possible to generate a virtual viewpoint image with high image quality, which suppresses a sudden change in color at the boundary portion of the area where different captured images are blended, irrespective of a difference in color and an error of a distance map included in multi-viewpoint image data. Further, it is also possible to make effective use of the resolution of the image capturing apparatus.

In the present embodiment, the case is explained as an example where only the beam angle data is used at the time of calculating the effectiveness degree of the image capturing apparatus, but it may also be possible to calculate the effectiveness degree by using also the position weight explained in the second embodiment. In that case, it is possible to generate a virtual viewpoint image with higher image quality compared to a case where the processing according to the present embodiment is performed alone.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is possible improve the image quality of a virtual viewpoint image generated from a plurality of images acquired by a plurality of image capturing apparatuses.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-199167, filed Oct. 23, 2018, which is hereby incorporated by reference herein in its entirety.

What is claimed is:

1. An image processing apparatus comprising:
one or more memories storing instructions; and
one or more processors executing the instructions to:
specify a relationship between a view direction from a virtual viewpoint and an image capturing direction of an image capturing apparatus included in a plurality of image capturing apparatuses capturing an image capturing area;
select one or more image capturing apparatuses from among the plurality of image capturing apparatuses based on the specified relationship and a resolution relating to image capturing by the image capturing apparatus included in the plurality of image capturing apparatuses;
determine a first value of the image capturing apparatus based on an angle between the view direction from the virtual viewpoint and the image capturing direction of the image capturing apparatus;
determine a second value of the image capturing apparatus based on a resolution applied to image capturing by the image capturing apparatus and the first value of the image capturing apparatus;
determine a weight of each of the selected one or more image capturing apparatuses based on the determined first value and the second value; and
determine a pixel value of a virtual viewpoint image viewed from the virtual viewpoint based on a pixel value or pixel values of one or more images obtained based on image capturing by the selected one or more image capturing apparatuses and the determined weight.

2. The image processing apparatus according to claim 1, wherein
the specified relationship indicates the angle between the view direction from the virtual viewpoint and the image capturing direction of the image capturing apparatus.

3. The image processing apparatus according to claim 1, wherein
the one or more image capturing apparatuses are selected for each pixel of the virtual viewpoint image.

4. The image processing apparatus according to claim 3, wherein
the one or more image capturing apparatuses associated with a pixel of the virtual viewpoint image are selected based on the specified relationship and a resolution relating to image capturing at a position corresponding to the pixel by the image capturing apparatus included in the plurality of image capturing apparatuses.

5. The image processing apparatus according to claim 1, wherein
the weight of an image capturing apparatus selected in a descending order of the second value is added and a weight of an image capturing apparatus not selected yet is determined as 0 in a stage where a sum of the added weights exceeds a predetermined value.

6. The image processing apparatus according to claim 1, wherein
the weight is determined such that the higher both the first value and the second value of the image capturing apparatus are, the heavier the weight is.

7. The image processing apparatus according to claim 1, wherein
the first value is determined such that the smaller the angle is, the higher the first value is.

8. The image processing apparatus according to claim 1, wherein the one or more processors further execute the instructions to:
determine a third value of the image capturing apparatus based on a position of an object within the image capturing area such that the nearer to a center portion of a visual field of the image capturing apparatus the position of the object is, the higher the third value of the image capturing apparatus is.

9. The image processing apparatus according to claim 8, wherein
the first value is determined based on the third value and the angle.

10. The image processing apparatus according to claim 8, wherein
the first value is determined such that the higher the third value is and the smaller the angle is, the higher the first value is.

11. The image processing apparatus according to claim 1, wherein
the second value is determined such that the higher the resolution of the image capturing apparatus is, the higher the second value is.

12. The image processing apparatus according to claim 1, wherein
the second value of the image capturing apparatus is determined based on a product or a sum of the resolution and the first value of the image capturing apparatus.

13. The image processing method according to claim 1, wherein
the resolution relating to image capturing by the image capturing apparatus is determined based on a distance between an object captured by the image capturing apparatus and the image capturing apparatus and a focal length of the image capturing apparatus.

14. The image processing method according to claim 13, wherein
in a case where the distance between the object captured by the image capturing apparatus and the image capturing apparatus is d and the focal length of the image capturing apparatus is f, and
the resolution relating to image capturing by the image capturing apparatus is determined based on d/f.

15. An image processing method comprising:
specifying a relationship between a view direction from a virtual viewpoint and an image capturing direction of an image capturing apparatus included in a plurality of image capturing apparatuses capturing an image capturing area;
selecting one or more image capturing apparatuses from among the plurality of image capturing apparatuses based on the specified relationship and a resolution relating to image capturing by the image capturing apparatus included in the plurality of image capturing apparatuses;
determining a first value of the image capturing apparatus based on an angle between the view direction from the virtual viewpoint and the image capturing direction of the image capturing apparatus;
determining a second value of the image capturing apparatus based on a resolution applied to image capturing by the image capturing apparatus and the first value of the image capturing apparatus;
determining a weight of each of the selected one or more image capturing apparatuses based on the determined first value and the second value; and
determining a pixel value of a virtual viewpoint image viewed from the virtual viewpoint based on a pixel value or pixel values of one or more images obtained based on image capturing by the selected one or more image capturing apparatuses and the determined weight.

16. The image processing method according to claim 15, wherein
the specified relationship indicates the angle between the view direction from the virtual viewpoint and the image capturing direction of the image capturing apparatus.

17. The image processing method according to claim 15, wherein
the one or more image capturing apparatuses are selected for each pixel of the virtual viewpoint image.

18. The image processing method according to claim 17, wherein
the one or more image capturing apparatuses associated with a pixel of the virtual viewpoint image are selected based on the specified relationship and a resolution relating to image capturing at a position corresponding to the pixel by the image capturing apparatus included in the plurality of image capturing apparatuses.

19. The image processing method according to claim 15, wherein
the weight of an image capturing apparatus selected in a descending order of the second value is added and a weight of an image capturing apparatus not selected yet is determined as 0 in a stage where a sum of the added weights exceeds a predetermined value.

20. The image processing method according to claim 15, wherein
the weight is determined such that the higher both the first value and the second value of the image capturing apparatus are, the heavier the weight is.

21. The image processing method according to claim 15, wherein
the first value is determined such that the smaller the angle is, the higher the first value is.

22. A non-transitory computer readable storage medium storing a program for causing a computer to perform an image processing method comprising:
specifying a relationship between a view direction from a virtual viewpoint and an image capturing direction of an image capturing apparatus included in a plurality of image capturing apparatuses capturing an image capturing area;
selecting one or more image capturing apparatuses from among the plurality of image capturing apparatuses based on the specified relationship and a resolution relating to image capturing by the image capturing apparatus included in the plurality of image capturing apparatuses;
determining a first value of the image capturing apparatus based on an angle between the view direction from the virtual viewpoint and the image capturing direction of the image capturing apparatus;
determining a second value of the image capturing apparatus based on a resolution applied to image capturing by the image capturing apparatus and the first value of the image capturing apparatus;
determining a weight of each of the selected one or more image capturing apparatuses based on the determined first value and the second value; and
determining a pixel value of a virtual viewpoint image viewed from the virtual viewpoint based on a pixel value or pixel values of one or more images obtained based on image capturing by the selected one or more image capturing apparatuses and the determined weight.

\* \* \* \* \*